(12) United States Patent
Owada et al.

(10) Patent No.: US 12,473,964 B2
(45) Date of Patent: Nov. 18, 2025

(54) HST AND TRANSMISSION

(71) Applicant: Kanzaki Kokyukoki Mfg. Co., LTD., Amagasaki (JP)

(72) Inventors: Kazuhiro Owada, Amagasaki (JP); Koji Iwaki, Amagasaki (JP); Kengo Sasahara, Amagasaki (JP)

(73) Assignee: Kanzaki Kokyukoki Mfg. Co., LTD., Amagasaki (JP)

( * ) Notice: Subject to any disclaimer, the term of this patent is extended or adjusted under 35 U.S.C. 154(b) by 0 days.

(21) Appl. No.: 18/898,109

(22) Filed: Sep. 26, 2024

(65) Prior Publication Data

US 2025/0020196 A1 Jan. 16, 2025

Related U.S. Application Data

(63) Continuation-in-part of application No. 18/607,102, filed on Mar. 15, 2024, now abandoned, which is a
(Continued)

(30) Foreign Application Priority Data

Jun. 11, 2019 (JP) .................................. 2019-108395

(51) Int. Cl.
*F16H 39/10* (2006.01)
*F16H 47/02* (2006.01)
(Continued)

(52) U.S. Cl.
CPC ............. *F16H 39/10* (2013.01); *F16H 47/02* (2013.01); *F16H 57/031* (2013.01); *F16H 57/043* (2013.01)

(58) Field of Classification Search
CPC ........ F16H 39/04; F16H 39/06; F16H 39/042; F16H 57/031; F16H 57/043
See application file for complete search history.

(56) References Cited

U.S. PATENT DOCUMENTS 3,810,519 A * 5/1974 Galos ...................... F16H 39/12
74/606 R
4,145,883 A * 3/1979 Forster .................... F16H 39/14
60/458

(Continued)

FOREIGN PATENT DOCUMENTS

| | | |
|---|---|---|
| CN | 206682275 U | 11/2017 |
| JP | 5316223 B2 | 10/2013 |
| WO | 2004/104448 A1 | 12/2004 |

OTHER PUBLICATIONS

International Search Report issued in International Application No. PCT/JP2020/022045, mailed Jul. 28, 2020, 4 pages.

*Primary Examiner* — Thomas E Lazo
(74) *Attorney, Agent, or Firm* — Sterne, Kessler, Goldstein & Fox P.L.L.C.

(57) ABSTRACT

In a transmission of the present invention, a transmission case has a peripheral wall with an opening sized to allow an HST to be other than a main plate of the HST. The HST has the main plate and a sub-plate sandwiching members out of a center section, a pump-side holder and a motor-side holder that face to each other with the pump main body and the motor main body being arranged between the members. The sub-plate has an engaging portion, and the transmission case has a mounting seat with which the engaging portion is engaged in a slidable manner so that the HST is guided until an installation position.

9 Claims, 24 Drawing Sheets

Related U.S. Application Data continuation of application No. 17/617,894, filed as application No. PCT/JP2020/022045 on Jun. 4, 2020, now Pat. No. 11,933,391.

(51) Int. Cl.
*F16H 57/031* (2012.01)
*F16H 57/04* (2010.01)

(56) References Cited

U.S. PATENT DOCUMENTS

| | | | | |
|---|---|---|---|---|
| 4,914,907 | A * | 4/1990 | Okada | B60K 17/105 |
| | | | | 60/487 |
| 6,283,009 | B1 * | 9/2001 | Hayashi | F04B 1/2042 |
| | | | | 91/499 |
| 11,933,391 | B2 * | 3/2024 | Owada | F16H 57/031 |
| 2005/0254965 | A1 * | 11/2005 | Makino | F01B 3/0017 |
| | | | | 91/499 |
| 2006/0120884 | A1 | 6/2006 | Nozaki | |
| 2014/0096515 | A1 * | 4/2014 | Mochizuki | F16H 57/0471 |
| | | | | 60/492 |
| 2017/0335939 | A1 * | 11/2017 | Iwaki | F16H 13/08 |

* cited by examiner

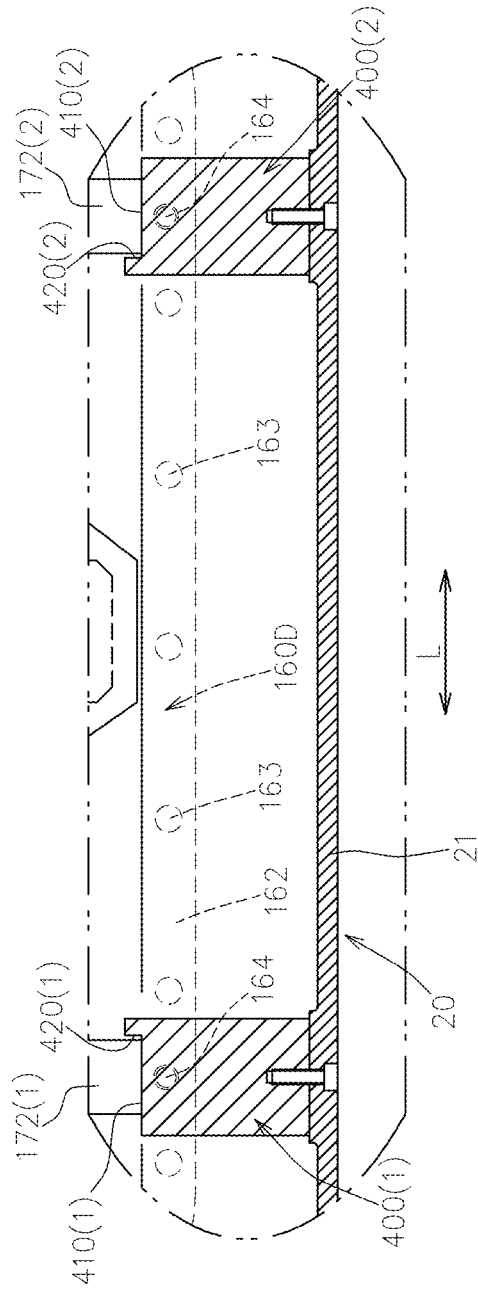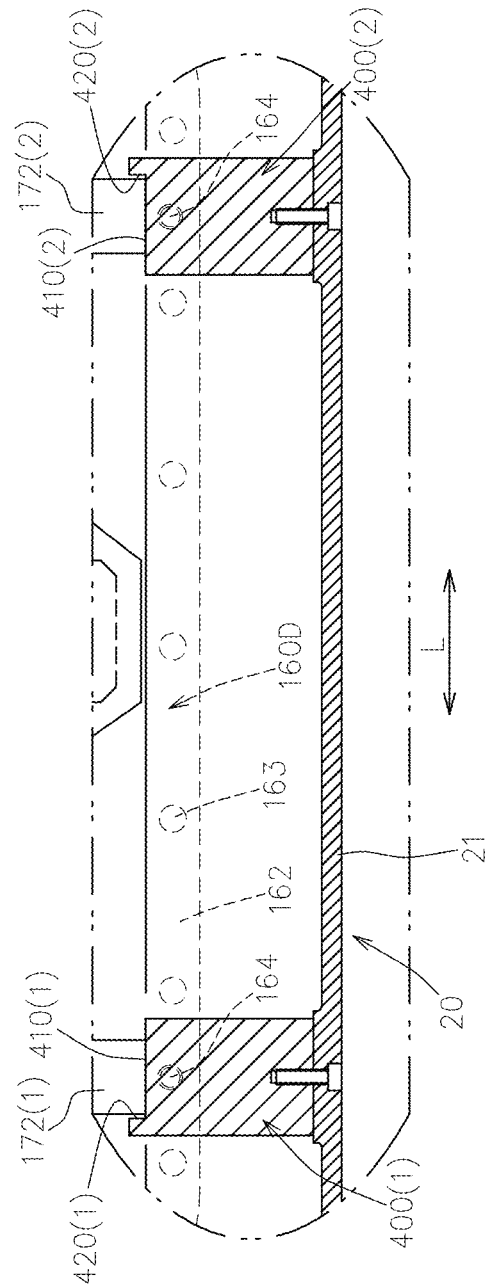

HST AND TRANSMISSION

CROSS-REFERENCE TO RELATED APPLICATIONS

The present application is a continuation-in-part of U.S. patent application Ser. No. 18/607,102, filed Mar. 15, 2024, which is a continuation of U.S. patent application Ser. No. 17/617,894, filed Dec. 9, 2021, which is a national stage entry of International Application No. PCT/JP2020/022045, filed Jun. 4, 2020, which claims priority to Japanese Patent Application No. 2019-108395, filed Jun. 11, 2019. Each of these applications are incorporated herein in their entirety by reference thereto.

FIELD OF THE INVENTION

The present invention relates to an HST (Hydrostatic Transmission) including a hydraulic pump and a hydraulic motor that are fluidly connected to each other, and a transmission including the HST.

BACKGROUND ART

An HST capable of speed-change a rotational power in a stepless manner is preferably used as a part or a whole of a travel system transmission provided in a work vehicle such as a combine harvester and a tractor.

The following patent literature 1 discloses a transmission that shifts and transmits a rotational power from an engine arranged in front to a rear wheel that serves as a drive wheel, and that has a casing provided with an opening that opens upward and an HST housed in the casing, wherein all components of the HST are supported by a cover that closes the opening.

The transmission described in the patent literature 1 is useful in that the HST can be removed by removing the cover from the casing while the casing is mounted on a vehicle.

However, in the configuration described in the patent literature 1, all components of the HST are supported by the cover in a cantilevered state, causing a problem that support stability is lacking.

PRIOR ART DOCUMENT

Patent Literature

Patent Literature 1: Japanese Patent Application Laid-Open No. Showa 53 (1978)-016223

SUMMARY OF THE INVENTION

The present invention has been made in view of the conventional technology, and it is a first object to provide a transmission with an HST being mounted therein, wherein the HST can be smoothly attached to and detached from a transmission case without disassembling HST components, while stabilizing a supporting state of the HST in the transmission case.

In addition, it is a second object of the present invention to provide an HST capable of being smoothly attached to and detached from a transmission case without disassembling HST components, while realizing a stabilizing a supporting state of the HST in the transmission case.

In order to achieve the first object, a first aspect of the present invention provides a transmission that speed-changes rotational power operatively input from a drive source, the transmission including a transmission case; and an HST arranged at a predetermined installation position within the transmission case, wherein the HST includes a pump shaft, a pump main body supported by the pump shaft in a relatively non-rotatable manner around an axial line with respect to the pump shaft, a pump-side holder supporting the pump shaft in a rotatable manner around the axial line, a motor shaft, a motor main body supported by the motor shaft in a relatively non-rotatable manner around an axial line with respect to the motor shaft, a motor-side holder that supporting the motor shaft in a rotatable manner around the axial line, a center section that is formed with oil paths fluidly connecting the pump main body and the motor main body, and a main plate and a sub-plate sandwiching members out of the center section, the pump-side holder and the motor-side holder that face to each other in a state that the pump main body and the motor main body are arranged between the members, wherein the transmission case has a peripheral wall and an opening formed in the peripheral wall, wherein the opening is so sized as to allow, in an assembled state of the HST, insertion of components other than the main plate of the HST, wherein the HST is configured so that the main plate is detachably connected to an outer surface of the peripheral wall of the transmission case in a state where the HST is arranged at the installation position, wherein the sub-plate is provided with an engaging portion, and wherein the transmission case is provided with a mounting seat with which the engaging portion is engaged in a slidable manner so that the HST is guided until the installation position.

In a first embodiment, the transmission according to the present invention may further include an input-side transmission shaft that is operatively connected to the drive source and is supported by the transmission case in a rotatable manner around an axial line; an input-side transmission gear supported by the input-side transmission shaft in a relatively non-rotatable manner around the axial line with respect to the input-side transmission shaft within the transmission case; an output-side transmission shaft supported by the transmission case in a rotatable manner around an axial line; and an output-side transmission gear supported by the output-side transmission shaft in a relatively non-rotatable manner around the axial line with respect to the output-side transmission shaft within the transmission case.

In the first embodiment of the first aspect, the HST further includes a pump-side transmission gear supported, in a relatively non-rotatable manner around the axial line with respect to the pump shaft, by a portion of the pump shaft that extends from the pump-side holder in a direction away from the pump main body, and a motor-side transmission gear supported, in a relatively non-rotatable manner around the axial line with respect to the motor shaft, by a portion of the motor shaft that extends from the motor-side holder in a direction away from the motor main body.

The pump-side transmission gear and the motor-side transmission gear mesh with the input-side transmission gear and the output-side transmission gear, respectively, in accordance with arrangement of the HST at the installation position.

In one example, the pump main body and the motor main body are of an axial piston type. In this case, the pump-side holder is configured to support a pump-side swash plate defining a capacity of the pump main body and have a through hole through which the pump shaft is passed, and the motor-side holder is configured to support a motor-side swash plate defining a capacity of the motor main body and have a through hole through which the motor shaft is passed.

In one example, the sub-plate includes a sub-plate-side main body portion and the engaging portion extending downward from the sub-plate-side main body portion. The sub-plate-side main body portion is configured to cooperate with the main plate so as to sandwich the members out of the center section, the pump-side holder and the motor-side holder that face to each other in a state that the pump main body and the motor main body are arranged between the members. The mounting seat is provided on a bottom wall of the peripheral wall of the transmission case so as to extend between the opening and the installation position of the HST.

The mounting seat is preferably configured so that the engaging portion is engaged therewith in such a manner as to prevent the HST from moving a longitudinal direction of the transmission case while allowing the HST to move in a width direction of the transmission case between the opening and the installation position of the HST.

In a preferable configuration, the mounting seat is configured to include a mounting surface on which the engaging portion is mounted in a movable manner in the width direction of the transmission case, and a guide surface that extends upward from the mounting surface so as to prevent the engaging portion from moving in the longitudinal direction of the transmission case.

The mounting seat may have first and second mounting seats arranged apart from each other in the longitudinal direction of the transmission case, and the engaging portion may have first and second engaging portions that engage with the first and second mounting seats, respectively.

The first mounting seat is configured to include a first mounting surface on which the first engaging portion is mounted in a movable manner in the width direction of the transmission case, and a first guide surface preventing the first engaging portion from moving toward at least one side in the longitudinal direction of the transmission case. The second mounting seat is configured to include a second mounting surface on which the second engaging portion is mounted in a movable manner in the width direction of the transmission case, and a second guide surface preventing the second engaging portion from moving toward at least the other side in the longitudinal direction of the transmission case.

In any one of the transmissions according to the present invention, the main plate preferably includes a main-plate-side main body portion and an extended region. The main-plate-side main body portion is configured to cooperate with the sub-plate so as to sandwich the members out of the center section, the pump-side holder and the motor-side holder that face to each other in a state that the pump main body and the motor main body are arranged between the members. The extended region is configured to extend outward in a planar direction from the main-plate-side main body portion and be brought into contact with an outer surface of the peripheral wall of the transmission case in a state that the HST is arranged at the installation position.

The extended region is provided with a plurality of fastening holes and a plurality of main-plate-side threaded holes. The peripheral wall of the transmission case is provided with a plurality of transmission-case-side threaded holes. The plurality of fastening holes are provided at positions corresponding to the plurality of transmission-case-side threaded holes, respectively, and the plurality of main-plate-side threaded holes are provided at positions facing the outer surface of the peripheral wall.

In order to achieve the second object, a second aspect of the present invention provides an HST including a pump shaft; a pump main body supported by the pump shaft in a relatively non-rotatable manner around an axial line with respect to the pump shaft; a pump-side swash plate defining a capacity of the pump main body; a pump-side holder supporting the pump-side swash plate and also supporting the pump shaft in a rotatable manner around the axial line; a motor shaft; a motor main body supported by the motor shaft in a relatively non-rotatable manner around an axial line with respect to the motor shaft; a motor-side swash plate defining a capacity of the motor main body; a motor-side swash plate holder supporting the motor-side swash plate and also supporting the motor shaft in a rotatable manner around the axial line; a center section formed with oil paths fluidly connecting the pump main body and the motor main body; and a main plate and a sub-plate sandwiching members out of the center section, the pump-side holder and the motor-side holder that face to each other in a state that the pump main body and the motor main body are arranged between the members.

In the HST according to the second aspect of the present invention, the main plate includes a main-plate-side main body portion facing an installation space of the center section, the pump-side swash plate holder and the motor-side swash plate holder, and an extended region extending outward in a planar direction from the main-plate-side main body portion.

The sub-plate includes a sub-plate-side main body portion cooperating with the main-plate-side main body portion so as to sandwich the members out of the center section, the pump-side holder and the motor-side holder that face to each other in a state that the pump main body and the motor main body are arranged between the members, and an engaging portion extending outward in a planar direction from the sub-plate-side main body portion.

BRIEF DESCRIPTION OF THE DRAWINGS

FIG. 22A is a partial cross-sectional view of an HST according to a modified example of the fourth embodiment, as viewed from the inside of the transmission case.

FIG. 22B is a partial cross-sectional view of an HST according to another modified example of the fourth embodiment, as viewed from the inside of the transmission case.

EMBODIMENT FOR CARRYING OUT THE INVENTION

First Embodiment

One embodiment of an HST according to the present invention will be described below with reference to the accompanying drawings.

Figure 1:
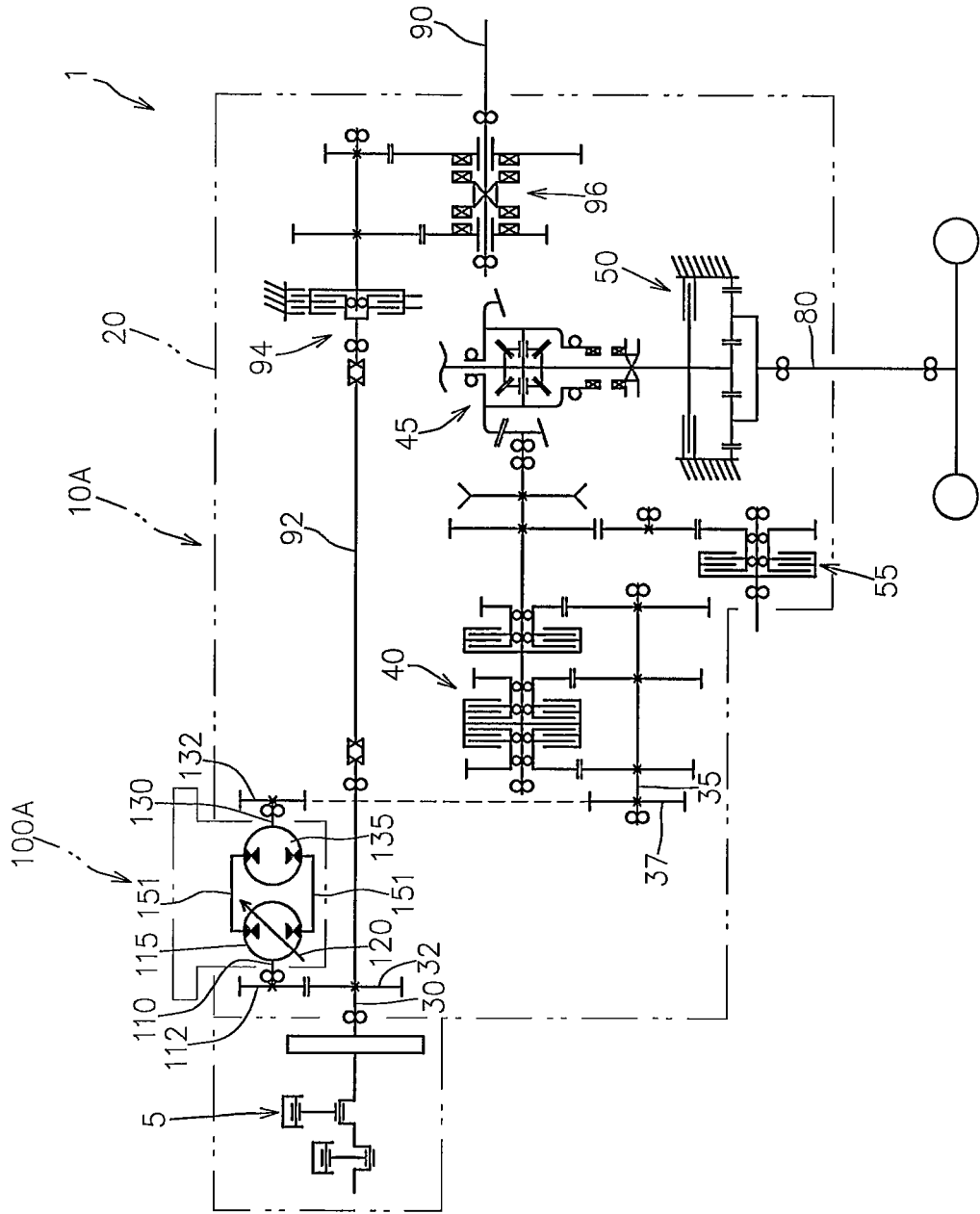
FIG. 1 is a schematic diagram of a power transmission of a work vehicle to which a transmission including an HST according to a first embodiment of the present invention is applied.

FIG. 1 illustrates a schematic diagram of a power transmission of a work vehicle 1 to which a transmission 10A provided with an HST 100A according to the present embodiment is applied.

Figure 2:
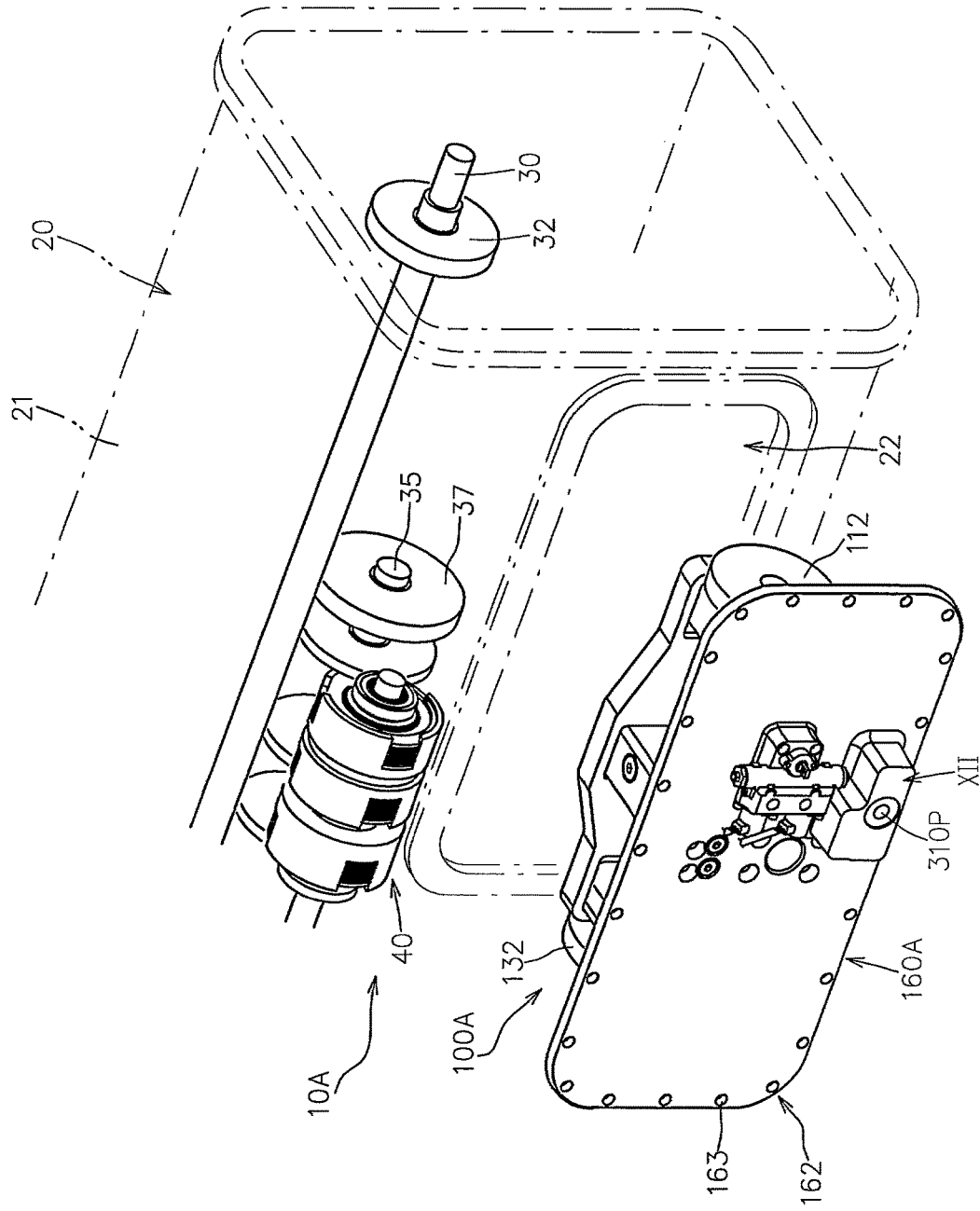
FIG. 2 is an exploded perspective view of a transmission case and the HST in the transmission.

FIG. 2 illustrates an exploded perspective view of a transmission case 20 and the HST 100A in the above transmission 10A.

Figure 3:
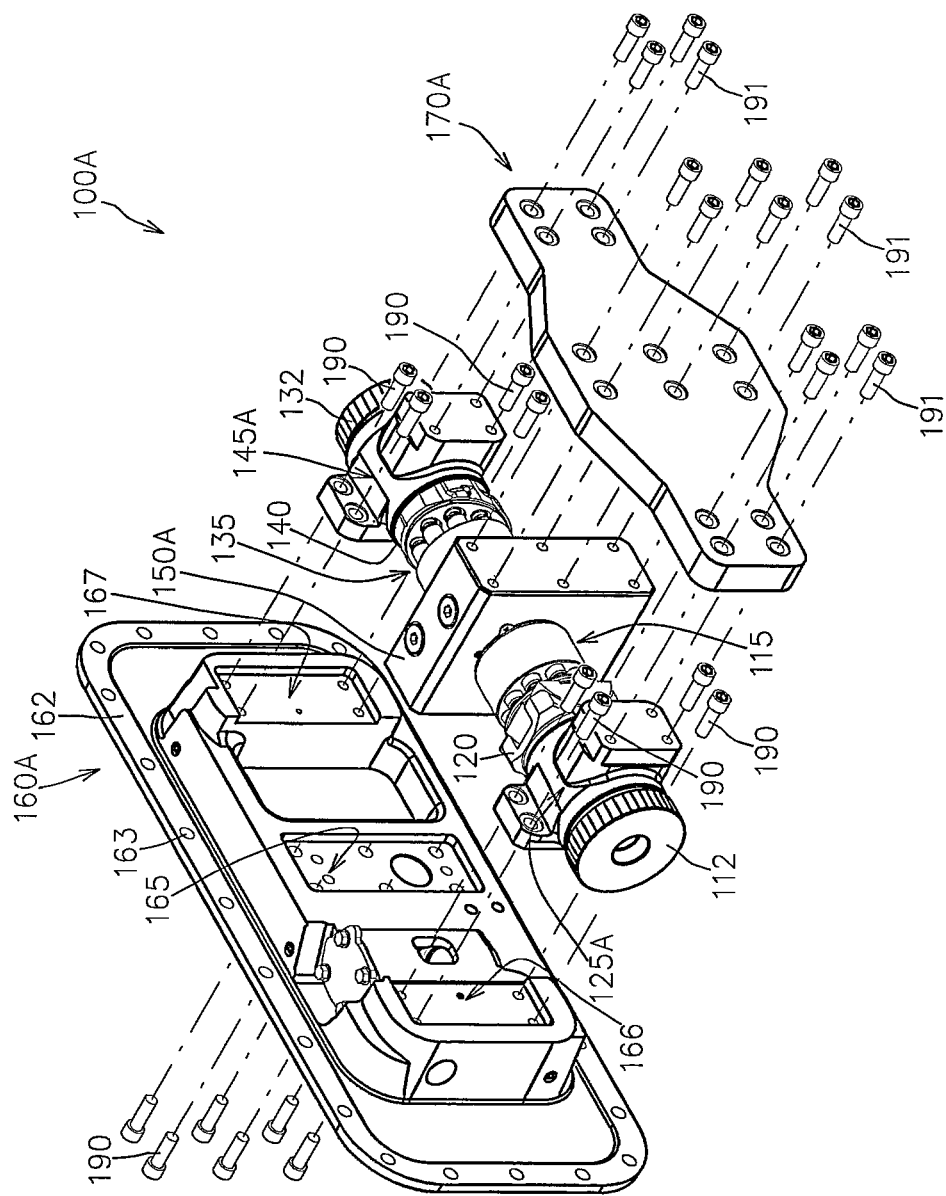
FIG. 3 is an exploded perspective view of the HST.
Figure 4:
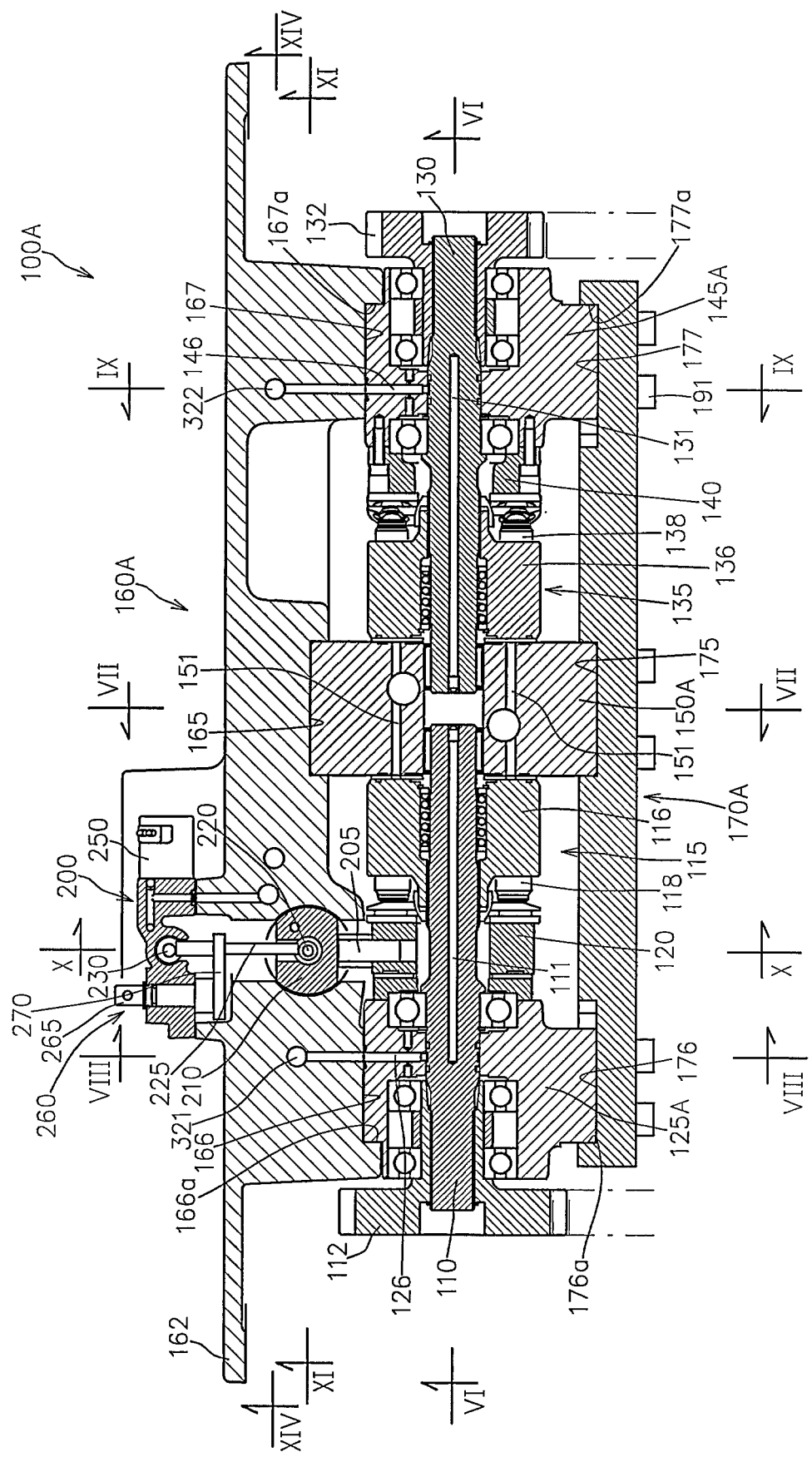
FIG. 4 is a transverse cross-sectional plan view of the HST.
Figure 5:
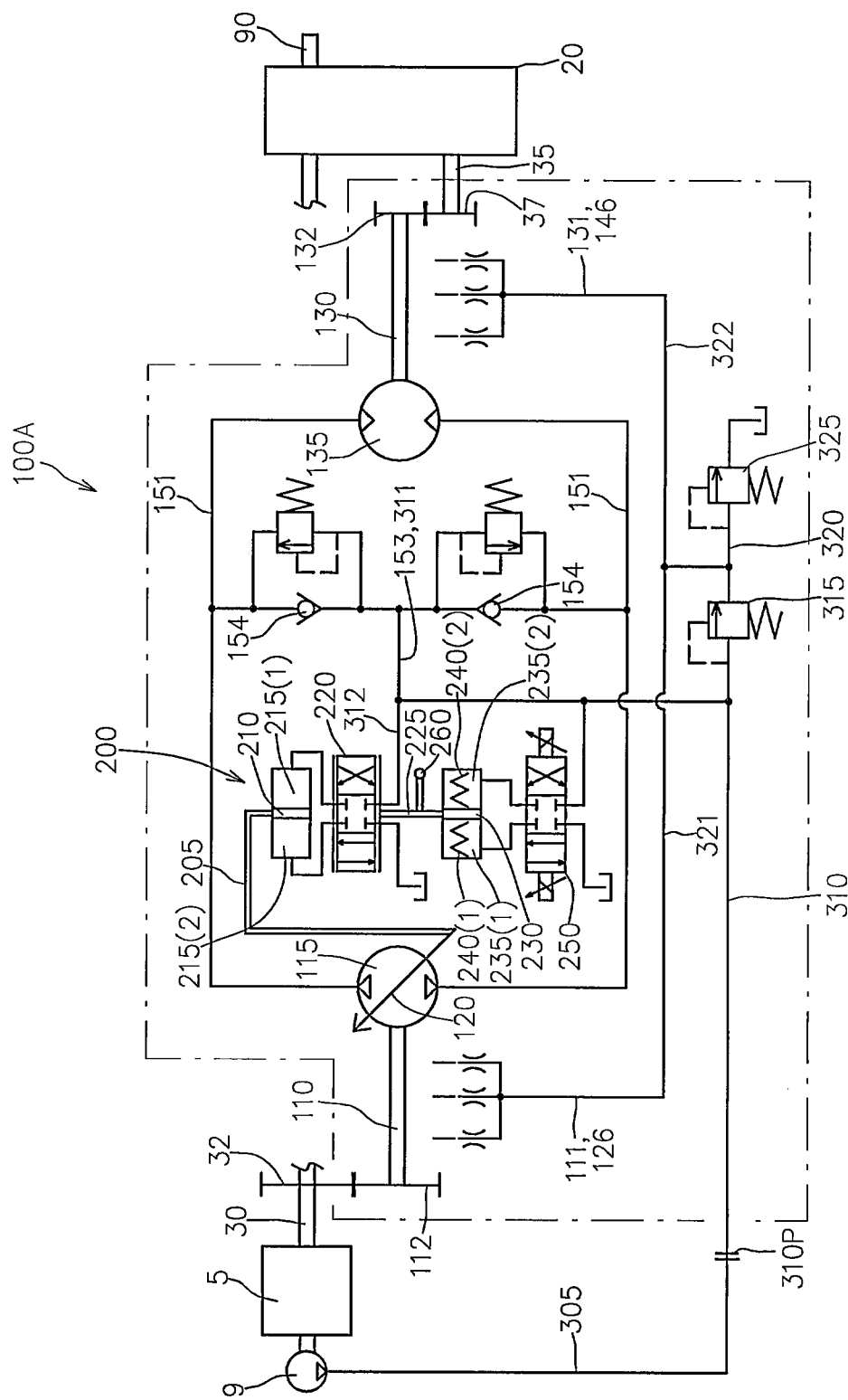
FIG. 5 is a hydraulic circuit diagram of the HST.

Further, FIGS. 3 to 5 illustrate an exploded perspective view, a transverse cross-sectional plan view, and a hydraulic circuit diagram of the HST 100A, respectively.

As illustrated in FIGS. 3, 4 and the like, the HST 100A includes a pump shaft 110 that operatively inputs a rotational power from a drive source 5 (FIG. 1) provided in the work vehicle 1, a pump main body 115 that is relatively non-rotatably supported by the pump shaft 110, a pump-side swash plate 120 that defines a capacity of the pump main body 115, a pump-side swash plate holder 125A which supports a rear surface of the pump-side swash plate 120, a motor shaft 130, a motor main body 135 which is relatively non-rotatably supported by the motor shaft 130, a motor-side swash plate 140 which defines a capacity of the motor main body 135, a motor-side swash plate holder 145A which supports a rear surface of the motor-side swash plate 140, a center section 150A, a main plate 160A, and a sub-plate 170A.

The HST 100A according to the present embodiment is of an in-line type in which the pump main body 115 and the motor main body 135 are arranged on one side and the other side in the thickness direction of the center section 150A, respectively, while being coaxially with each other.

Figure 6:
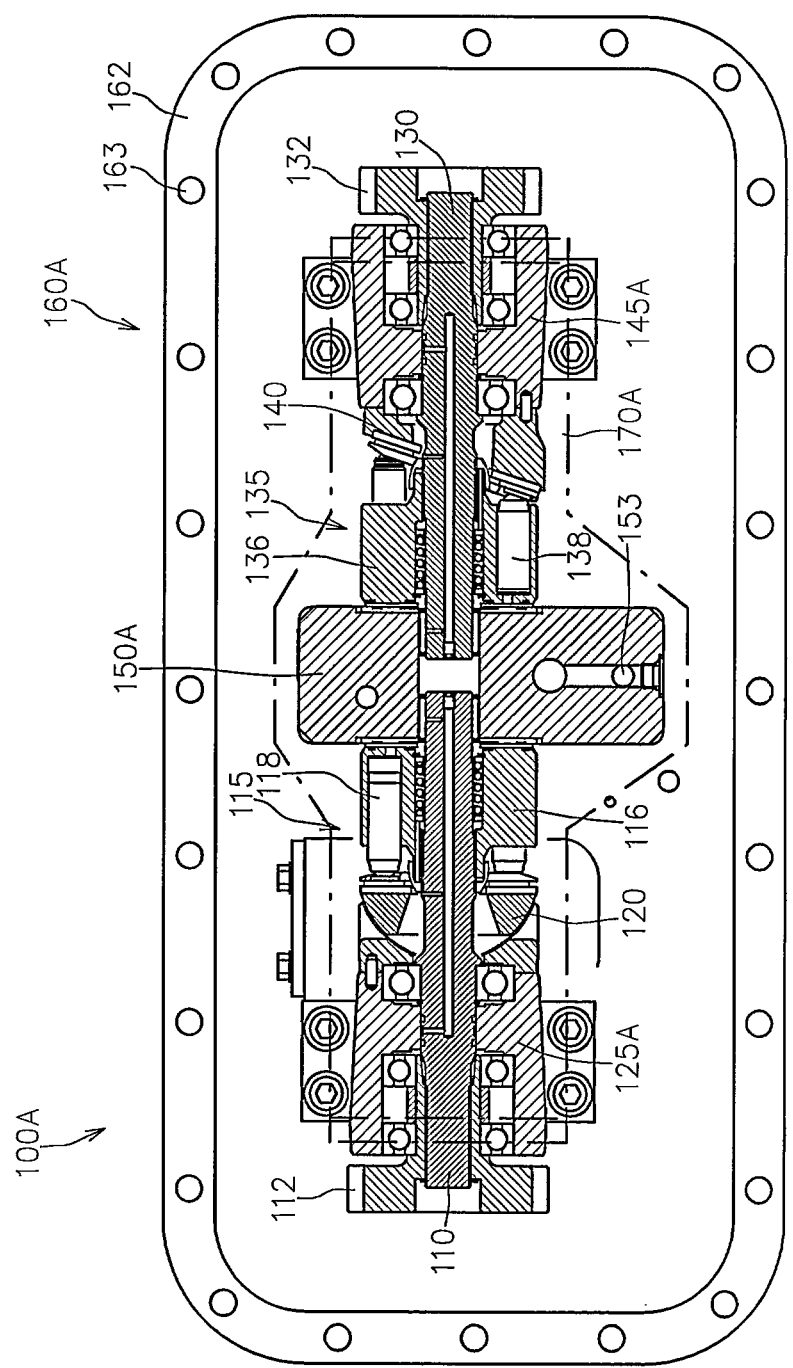
FIG. 6 is a cross-sectional view along the line VI-VI in FIG. 4.

FIG. 6 illustrates a cross-sectional view along the line VI-VI in FIG. 4.

As illustrated in FIGS. 4 and 6, the pump main body 115 has a pump-side cylinder block 116, and pump-side pistons 118 housed in the pump-side cylinder block 116 so as to be relatively non-rotatable around an axial line and to advance and retreat in an axial line direction with respect thereto.

The pump-side cylinder block 116 is relatively non-rotatably supported by the pump shaft 110 with a base end surface directly or indirectly contacting a first end surface on one side in the thickness direction of the center section 150A.

The pump-side swash plate 120 is engaged with tip end portions of the pump-side pistons 118 so as to define the advance or retreat amount of the pump-side pistons 118 per revolution around the axial line of the pump-side cylinder block 116, that is, the capacity of the pump main body 115.

In the present embodiment, the pump-side swash plate 120 is a movable swash plate that can swing around the swing axial line, and according to the swing position of the pump-side swash plate 120 around the swing axial line, the advance or retreat amount of the pump-side piston 118 changes thereby to change the capacity of the pump main body 115.

The pump-side swash plate holder 125A is arranged in a manner to support the rear surface of the pump-side swash plate 120 (a surface opposite in the axial line direction to the surface with which the pump-side piston 118 is engaged).

As described above, in the present embodiment, the pump-side swash plate 120 is a movable swash plate that can swing around the swing axial line. Accordingly, as illustrated in FIG. 6, the pump-side swash plate holder 125A has a concave support surface along the swing path of the rear surface of the pump-side swash plate 120 which path is seen when the pump-side swash plate 120 is swung around the swing axial line.

With the base end and tip end portions thereof rotatably supported by the center section 150A and the pump-side swash plate holder 125A, respectively, the pump shaft 110 supports the pump main body 115 at a middle portion in a manner relatively non-rotatable around the axial line with respect to the pump shaft 110.

The pump-side swash plate 120 is provided with a through hole that allows the pump shaft 110 to pass through.

As illustrated in FIGS. 4 and 6, the motor main body 135 has a motor-side cylinder block 136 and motor-side pistons 138 housed in the motor-side cylinder block 136 so as to be relatively non-rotatable around an axial line and to advance and retreat in an axial line direction with respect thereto.

With the base end surface directly or indirectly contacting the second end surface on the other side in the thickness direction of the center section 150A, the motor-side cylinder block 136 is supported by the motor shaft 130, which is arranged coaxially with the pump shaft 110, in a manner relatively non-rotatable around the axial line with respect to the motor shaft 130.

The motor-side swash plate 140 is engaged with the tip end portions of the motor-side pistons 138 so as to define the advance or retreat amount of the motor-side pistons 138 per revolution around the axial line of the motor-side cylinder block 136, that is, the capacity of the motor main body 135.

In the present embodiment, the motor-side swash plate 140 is a fixed swash plate in which a swash angle relative to the motor shaft 130 is fixed so that the capacity of the motor main body 135 is fixed.

The motor-side swash plate holder 145A is arranged in a manner to support the rear surface of the motor-side swash plate 140 (a surface opposite in the axial line direction to the surface with which the motor-side piston 138 is engaged).

As described above, in the present embodiment, the motor-side swash plate 140 is the fixed swash plate.

Accordingly, as illustrated in FIG. 6, the motor-side swash plate holder 145A has a swash support surface for fixing the motor-side swash plate 140 at a predetermined swash angle.

The motor shaft 130 is arranged coaxially with the pump shaft 110. With the base end and the tip end portions thereof rotatably supported by the center section 150A and the motor-side swash plate holder 145A, respectively, the motor shaft 130 supports the motor main body 135 at the middle portion in a manner relatively non-rotatable manner around the axial line with respect to the motor shaft 130.

The motor-side swash plate 140 is provided with a through hole that allows the motor shaft 130 to pass through.

Figure 7:
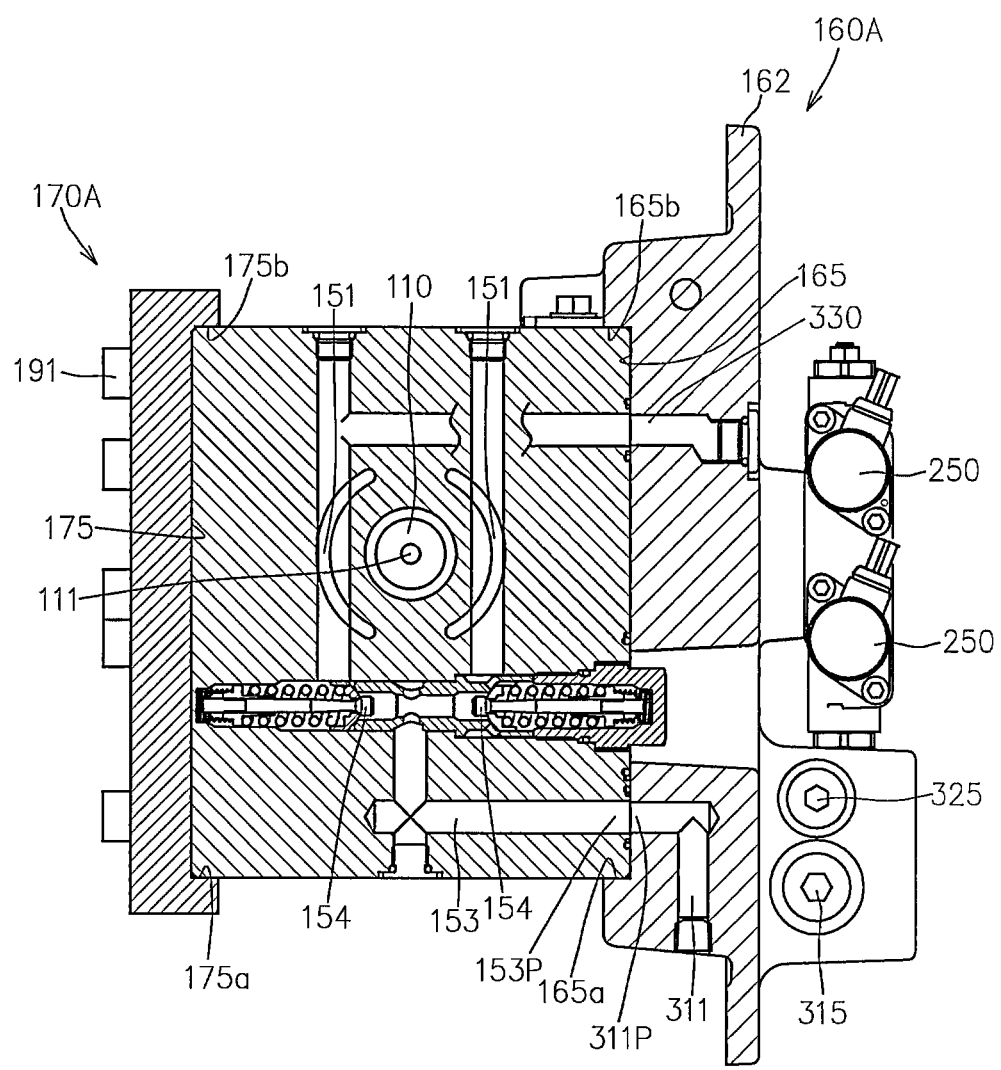
FIG. 7 is a cross-sectional view along the line VII-VII in FIG. 4.

FIG. 7 illustrates a cross-sectional view along the line VII-VII in FIG. 4.

As illustrated in FIG. 4, FIG. 7, etc., a pair of HST operation oil paths 151 which fluidly connects the pump main body 115 and the motor main body 135 is formed in the center section 150A.

The main plate 160A and the sub-plate 170A are so configured as to hold or support the center section 150A, the pump-side swash plate holder 125A, and the motor-side swash plate holder 145A in a sandwiched manner by their inner surfaces facing each other.

That is, the main plate 160A, with the inner surface thereof in contact with the side surfaces of the center section 150A, the pump-side swash plate holder 125A, and the motor-side swash plate holder 145A on one side in the width direction orthogonal to the thickness direction (that is, the axial line direction of the pump shaft 110 and the motor shaft 130), is connected to the above members by fastening members 190 (see FIG. 3), such as a bolt.

With the center section 150A, the pump-side swash plate holder 125A, and the motor-side swash plate holder 145A arranged between the inner surface of the sub-plate 170A and the inner surface of the main plate 160A, the sub-plate 170A is arranged so as to face the main plate 160A. Further, the inner surface of the sub-plate 170A is brought into contact with the side surfaces of the center section 150A, the pump-side swash plate holder 125A, and the motor-side swash plate holder 145A on the other side in the width direction, and is connected to the above members by fastening members 191 (see FIG. 3), such as a bolt.

As illustrated in FIGS. 3, 4, 6, and 7, etc., when viewed along a direction in which the main plate 160A and the sub-plate 170A face each other (i.e., a direction orthogonal to plate surfaces of the main plate 160A and the sub-plate 170A), the main plate 160A is provided with an extended region 162 that extends farther outward in the planar direction than an installation space of the center section 150A, the pump-side swash plate holder 125A, and the motor-side swash plate holder 145A, and than the sub-plate 170A.

According to the HST 100A having such a configuration, since the center section 150A, the pump-side swash plate holder 125A, and the motor-side swash plate holder 145A are supported at both sides by the main plate 160A and the sub-plate 170A, the support of the components can be stabilized.

Further, in the transmission case 20 to which the HST 100A is mounted, providing an opening 22 (see FIG. 2) that is smaller than the extended region 162 of the main plate 160A and larger than the installation space of the center section 150A, the pump-side swash plate holder 125A, and the motor-side swash plate holder 145A, and than the sub-plate 170A makes it possible to attach or detach the HST 100A to or from the transmission case 20 without disassembling the HST 100A.

Accordingly, the maintenance work and component replacement work of the HST 100A can be facilitated.

In detail, as illustrated in FIGS. 1 and 2, the transmission 10A is provided with the transmission case 20, an input-side transmission shaft 30 which is, in a state of being operatively connected to the drive source 5, supported by the transmission case 20 in a manner to rotate around an axial line, an input-side transmission gear 32 supported by the input-side transmission shaft 30 in a manner relatively non-rotatable around the axial line with respect to the input-side transmission shaft 30 within the transmission case 20, an output-side transmission shaft 35 supported by the transmission case 20 in a manner to rotate around an axial line, an output-side transmission gear 37 supported by the output-side transmission shaft 35 in a manner relatively non-rotatable manner around the axial line with respect to the output-side transmission shaft 35 within the transmission case 20, and the HST 100A. The input-side transmission gear 32 and the output-side transmission gear 37 are arranged axially spaced apart within a front half portion or a first half portion of the transmission case 20.

The HST 100A is so configured as to be detachably attached to the transmission case 20, and so configured that when the HST 100A is mounted on the transmission case 20, the pump shaft 110 is operatively connected to the input-side transmission shaft 30 and the motor shaft 130 is operatively connected to the output-side transmission shaft 35.

In detail, as illustrated in FIGS. 1 to 4 and the like, the HST 100A further has a pump-side transmission gear 112 supported by the pump shaft 110 in a manner relatively non-rotatable around the axial line with respect to the pump shaft 110 and a motor-side transmission gear 132 supported by the motor shaft 130 in a manner relatively non-rotatable around the axial line with respect to the motor shaft 130.

In the present embodiment, the pump-side transmission gear 112 is supported at a portion of the pump shaft 110 that extends from a portion passing through the pump-side swash plate holder 125A in a direction away from the pump main body 115, and the motor-side transmission gear 132 is supported at a portion of the motor shaft 130 that extends from a portion passing through the motor-side swash plate holder 145A in a direction away from the motor main body 135.

As illustrated in FIG. 2, the transmission case 20 has, in the first half portion thereof, a peripheral wall 21 and the opening 22 provided in the peripheral wall 21.

The opening 22 is so sized as to allow, in the assembled state of the HST 100A, insertion of components other than the main plate 160A in the HST 100A.

That is, the opening 22 is so configured as to be larger than the installation space of the center section 150A, the pump-side swash plate holder 125A, and the motor-side swash plate holder 145A, and than the sub-plate 170A, but smaller than the extended region 162 of the main plate 160A.

In the present embodiment, the opening 22 is provided at a side surface of the peripheral wall 21, the side surface being located on the side based on the state in which the transmission case 20 is mounted on the work vehicle 1.

Alternatively, it is also possible to provide the opening 22 at an upper surface or a lower surface of the peripheral wall 21.

As illustrated in FIGS. 2 and 3, fastening holes 163 through which fastening members such as a bolt can be inserted are formed at the extended region 162 of the main plate 160A.

The extended region 162 is brought in contact with an outer surface of the peripheral wall 21 of the transmission case 20 in a state in which the HST 100A's component other than the main plate 160A is housed within the transmission case 20 via the opening 22, and is detachably connected to the outer surface via fastening members such as a bolt to be inserted into the fastening hole 163.

Further, the pump-side transmission gear 112 and the motor-side transmission gear 132 are so arranged to respectively mesh with the input-side transmission gear 32 and the output-side transmission gear 37 in accordance with connection of the extended region 162 of the main plate 160A to the outer surface of the peripheral wall 21 of the transmission case 20.

As illustrated in FIGS. 3 and 4, in the present embodiment, the inner surfaces of the main plate 160A and the sub-plate 170A are provided with center section-directed concave portions 165 and 175 in which the center section 150A is engaged in a manner to be immovable in the thickness direction.

Providing such a configuration makes it possible to stabilize the support of the HST preassembly in which the center section 150A, the pump shaft 110, the pump main body 115, the pump-side swash plate 120, the pump-side swash plate holder 125A, the motor shaft 130, the motor main body 135, the motor-side swash plate 140, and the motor-side swash plate holder 145A are assembled.

In the present embodiment, the main plate 160A and the sub-plate 170A are formed with the center section-directed concave portions 165 and 175, respectively, but it is possible that only one of the main plate 160A and the sub-plate 170A is formed with the corresponding concave portion.

Further, as illustrated in FIGS. 3 and 4, in the present embodiment, the inner surfaces of the main plate 160A and the sub-plate 170A are provided with pump-side concave portions 166 and 176 into which the pump-side swash plate holder 125A is engaged, and motor-side concave portions 167 and 177 into which the motor-side swash plate holder 145A is engaged.

The pump-side concave portions 166, 176 and the motor-side concave portions 167, 177 are so configured as to prevent the pump-side swash plate holder 125A and the motor-side swash plate holder 145A from moving in a direction away from the center section 150A with respect to the thickness direction (axial line direction of the pump shaft 110 and the motor shaft 130).

As illustrated in FIG. 4, in the present embodiment, the pump-side concave portions 166 and 176 have step portions 166a and 176a that engage with end surfaces of the pump-side swash plate holder 125A on a far side from the center section 150A.

The motor-side concave portions 167 and 177 have step portions 167a and 177a that engage with end surfaces of the motor-side swash plate holder 145A on a far side from the center section 150A.

Providing such a configuration can further stabilize the support state of the HST preassembly.

In place of this configuration, the pump-side concave portions 166, 176 and the motor-side concave portions 167, 177 can be so configured as to prevent the pump-side swash plate holder 125A and the motor-side swash plate holder 145A from moving in a direction proximate to the center section 150A with respect to the thickness direction.

That is, the pump-side concave portions 166 and 176 can be so configured as to have step portions that engage with the end surfaces of the pump-side swash plate holder 125A on a near side to the center section 150A, and the motor-side concave portions 167 and 177 can be so configured as to have step portions that engage with the end surfaces of the motor-side swash plate holder 145A on a near side to the center section 150A.

In the present embodiment, as illustrated in FIG. 7, the center section-directed concave portions 165, 175 have step portions 165a, 165b, 175a, 175b that engage with the lower surface and upper surface of the center section 150A.

Figure 8:
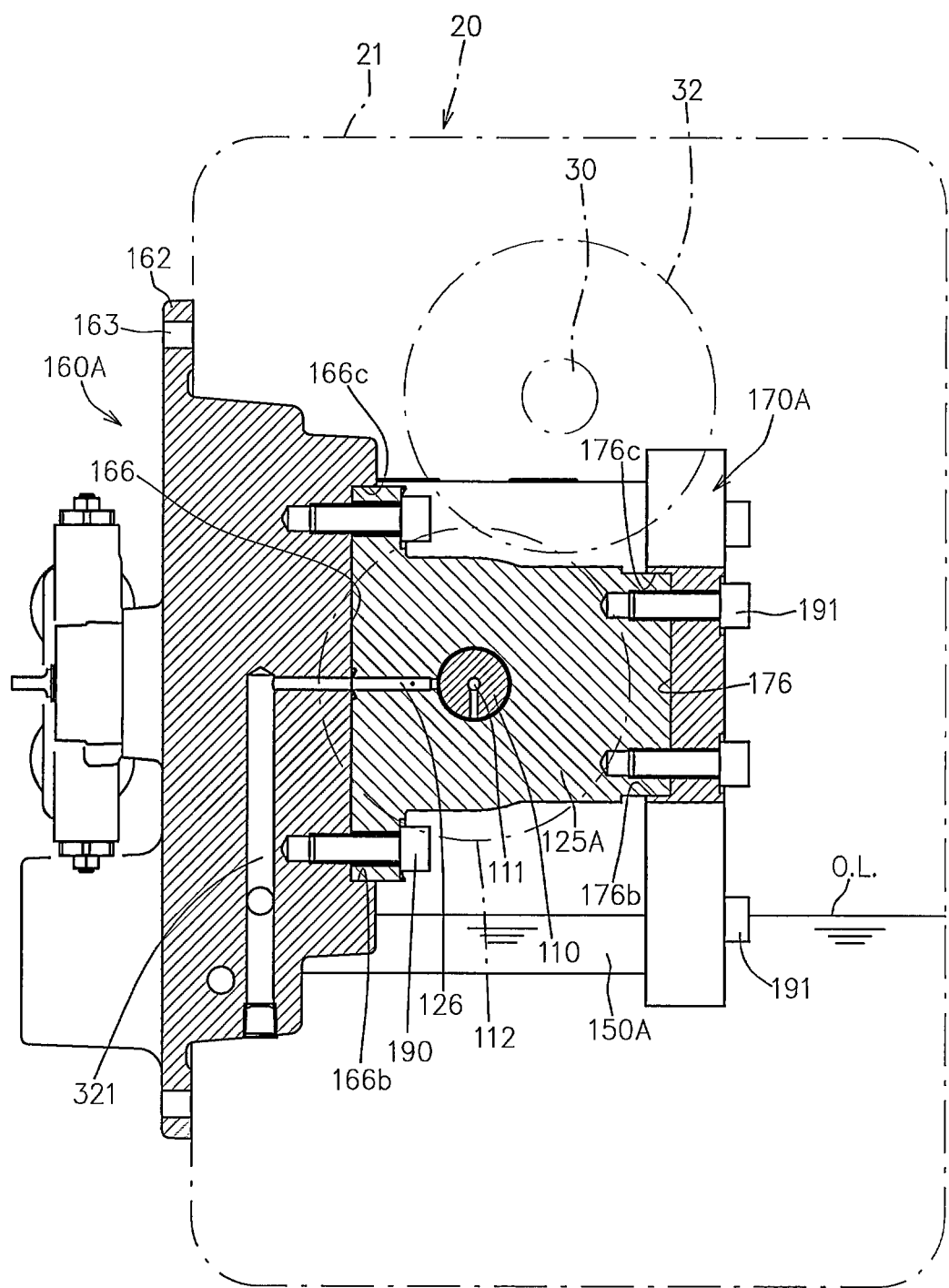
FIG. 8 is a cross-sectional view along the lines VIII-VIII in FIG. 4.
Figure 9:
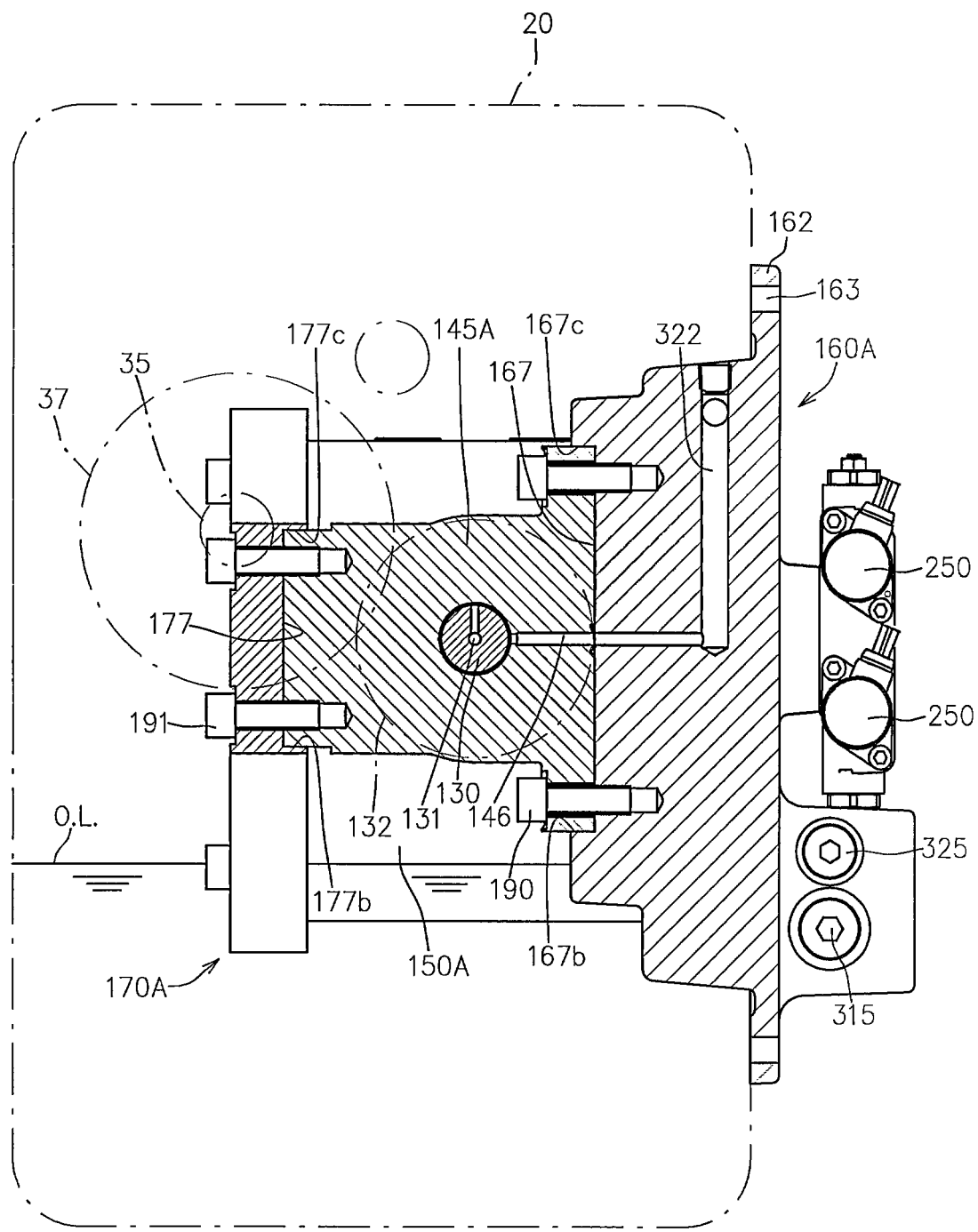
FIG. 9 is a cross-sectional view along the line IX-IX in FIG. 4.

FIGS. 8 and 9 illustrate cross-sectional views along the lines VIII-VIII and IX-IX in FIG. 4, respectively.

As illustrated in FIG. 8, in the present embodiment, the pump-side concave portions 166 and 176 have step portions 166b, 176b, 166c, and 176c that engage with the lower surface and upper surface of the pump-side swash plate holder 125A.

Similarly, as illustrated in FIG. 9, the motor-side concave portions 167 and 177 have step portions 167b, 177b, 167c, and 177c that engage with the lower surface and upper surface of the motor-side swash plate holder 145A.

Such a configuration can further stabilize the support of the HST preassembly.

In the present embodiment, the center section-directed concave portions 165 and 175 have step portions 165a and 175a that engage with the lower surfaces of the center section 150A and step portions 165b and 175b that engage with the upper surfaces of the center section 150A, but alternatively, can be modified in such a way as to have only the step portion that engages with any one of the lower surface and the upper surface.

The pump-side concave portions 166 and 176 and the motor-side concave portions 167 and 177 have step portions 166b, 176b, 167b, and 177b that engage with the lower surfaces of the corresponding swash plate holder and step portions 166c, 176c, 167c, and 177c that engage with the upper surfaces of the corresponding swash plate holder, but alternatively, can be transformed in such a way as to have only the step portion that engages with any one of the lower surface and the upper surface.

In the present embodiment, although the pump-side concave portions 166 and 176 are provided in the main plate 160A and the sub-plate 170A respectively, and the motor-side concave portions 167 and 177 are provided in the main plate 160A and the sub-plate 170A respectively, it is also possible to provide the pump-side concave portion only in one of the main plate 160A and the sub-plate 170A, and/or to provide the motor-side concave portions only in one of the main plate 160A and the sub-plate 170A.

As illustrated in FIGS. 4 and 5, the above HST 100A according to the present embodiment further has a hydraulic servo mechanism 200 that generates a force for swinging a movable swash plate (the pump-side swash plate 120 in the present embodiment).

In the present embodiment, the hydraulic servo mechanism 200 is provided at the main plate 160A.

Figure 10:
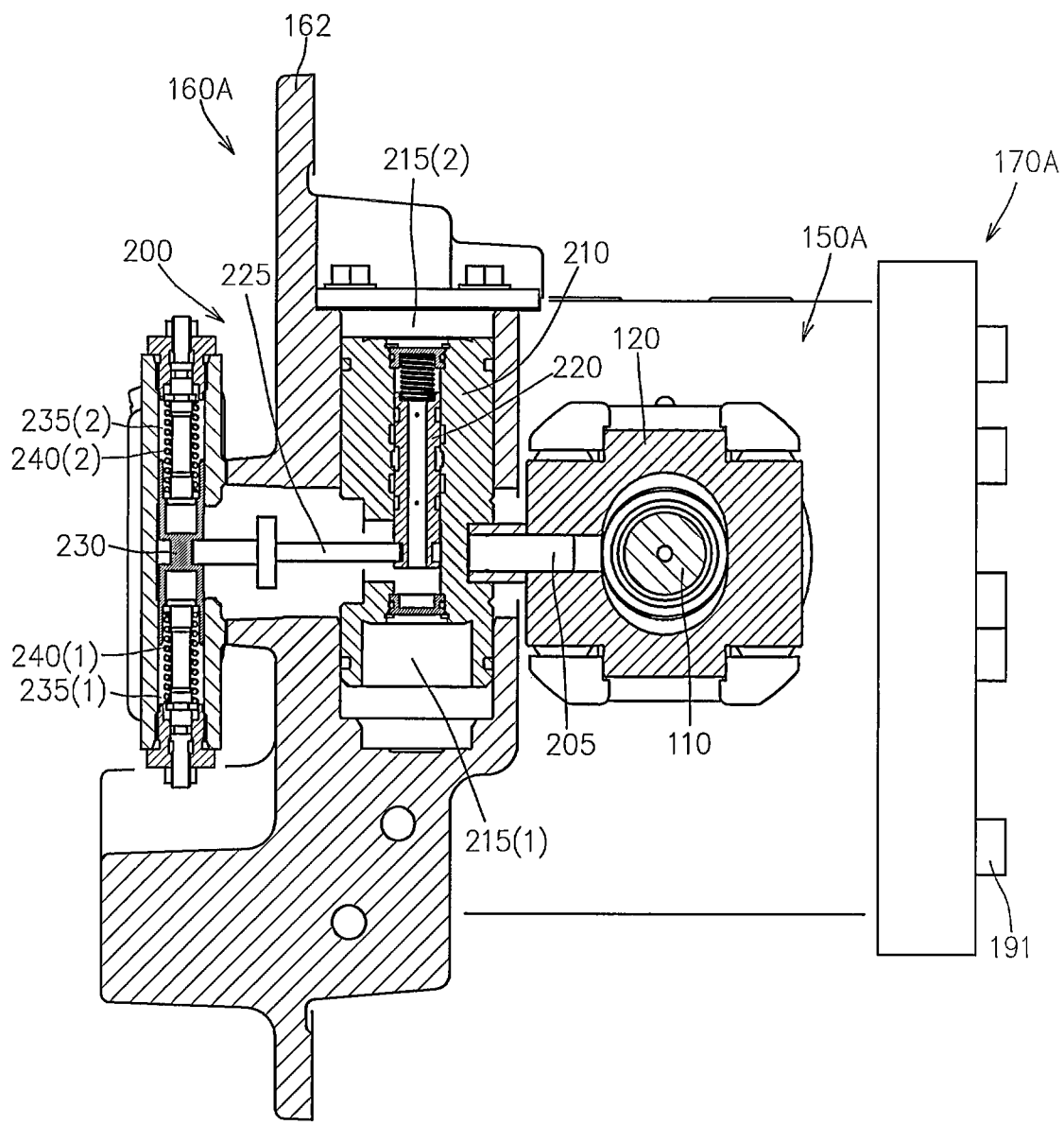
FIG. 10 is a cross-sectional view along the line X-X in FIG. 4.
Figure 11:
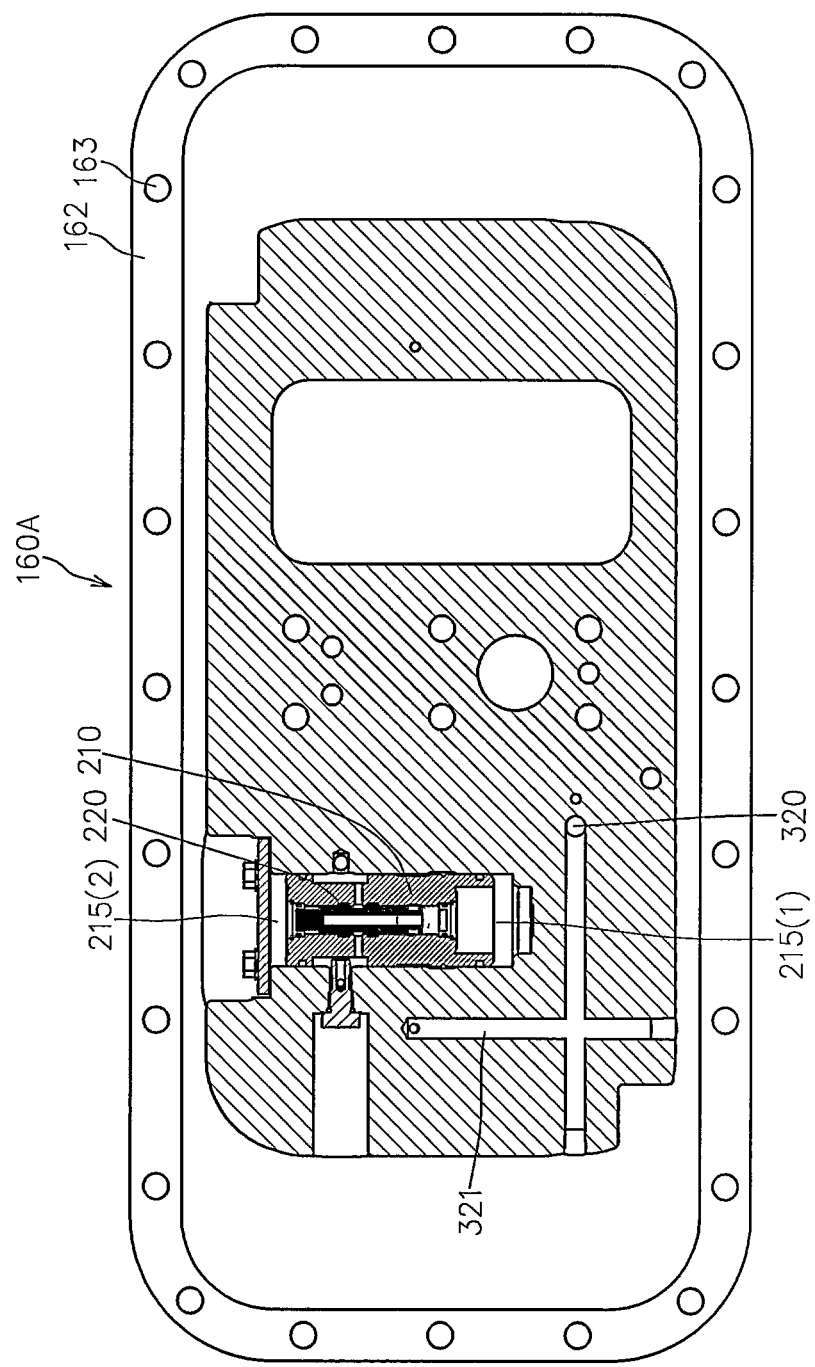
FIG. 11 is a cross-sectional view along the line XI-XI in FIG. 4.

FIGS. 10 and 11 illustrate cross-sectional views along the lines X-X and XI-XI in FIG. 4, respectively.

As illustrated in FIGS. 4, 5, 10 and 11, the hydraulic servo mechanism 200 includes: a pushing piston 210 housed in the main plate 160A in a manner to be reciprocally movable in a direction (hereinafter, referred to as pushing direction) orthogonal to both the axial line of the hydraulic body (the pump main body 115 in the present embodiment) having the capacity varied by the movable swash plate (the pump-side swash plate 120 in the present embodiment) and the swing axial line, and is operatively connected to the movable swash plate via a connecting rod 205 so that the movable swash plate swings around the swing axial line by a movement along the pushing direction, first and second hydraulic oil chambers 215 (1) and 215 (2) formed in the main plate 160A in a manner that pressure oil supplied into the first and second hydraulic oil chambers push the pushing piston 210 to one side and the other side respectively in the pushing direction, respectively, a switching spool 220 that can selectively take: a first operation position where a hydraulic source is fluidly connected to the first hydraulic oil chamber 215 (1) and the second hydraulic oil chamber 215 (2) is drained thereby to supply the pressure oil from the hydraulic source to the first hydraulic oil chamber 215 (1), a second operation position where the hydraulic source is fluidly connected to the second hydraulic oil chamber 215 (2) and the first hydraulic oil chamber 215 (1) is drained thereby to supply the pressure oil from the hydraulic source to the second hydraulic oil chamber 215 (2), and a close position for closing the first hydraulic oil chamber 215 (1) and the second hydraulic oil chamber 215 (2), an operating piston 230 that is, in a state of being connected to the switching spool 220 via a connection pin 225, reciprocally housed in the main plate 160A, and can take: a first operation position, a hold position, and a second operation position for respectively positioning the switching spool 220 in the first operation position, the close position, and the second operation position, a first operation oil chamber 235 (1) and a second operation oil chamber 235 (2) formed in the main plate 160A in a manner that the supplied pressure oil can push the operating piston 230 to the first operation position and the second operation position respectively, and an operating valve 250 that can selectively take: a first position where the hydraulic source is fluidly connected to the first operation oil chamber 235 (1) and the second operation oil chamber 235 (2) is drained thereby to supply the pressure oil from the hydraulic source to the first operation oil chamber 235 (1) so as to position the operating piston 230 in the first operation position, a second position where the hydraulic source is fluidly connected to the second operation oil chamber 235 (2) and the first operation oil chamber 235 (1) is drained thereby to supply the pressure oil from the hydraulic source to the second operation oil chamber 235 (2) so as to position the operating piston 230 in the second operation position, and a close position where the first operation oil chamber 235 (1) and the second operation oil chamber 235 (2) are closed thereby to position the operating piston 230 in the hold position.

In the present embodiment, the switching spool 220 is housed in an axial line hole formed in the pushing piston 210, and the direction in which the switching spool reciprocates (switch direction) and the pushing direction in which the pushing piston reciprocates are the same.

In the present embodiment, the operating valve 250 is a solenoid valve that is operated and controlled by a control device provided in the work vehicle 1.

As illustrated in FIG. 5 and FIG. 10, in the present embodiment, a first spring 240 (1) for biasing the operating piston 230 toward the first operation position is arranged in the first operation oil chamber 235 (1), and a second spring 240 (2) for biasing the operating piston 230 toward the second operation position is arranged in the second operation oil chamber 235 (2).

The first and second springs 240(1), 240(2) are set to exert a biasing force in a manner to position the operating piston 230 in the hold position, when the pressure oil fails to act on both of the first and second operation oil chambers 235(1), 235(2).

The HST 100A further has a manual operating mechanism 260 for manually moving the switching spool 220.

In detail, as illustrated in FIG. 4, the direction in which the operating piston 230 reciprocates (operation direction) and the direction in which the switching spool 220 reciprocates (switch direction) are parallel to each other, and the connection pin 225 has a base end portion engaged with the switching spool 220 and a tip end portion engaged with the operating piston 230 so that the switching spool 220 moves along the switch direction in accordance with the movement of the operating piston 230 in the operation direction.

In the present embodiment, the manual operating mechanism 260 is provided at the main plate 160A.

In detail, the manual operating mechanism 260 has an operation shaft 265 supported by the main plate 160A rotatably around an axial line in a state that it is parallel to the connection pin 225 and its tip end portion extends outward, and a connection arm 270 that has a base end portion connected to the operation shaft 265 in a manner to be relatively non-rotatable around an axial line with respect thereto and has a tip end portion connected to the connection pin 225.

Rotating the operation shaft 265 around the axial line by human operation moves the switching spool 220 in the switch direction via the connection arm 270 and the connection pin 225.

Providing the manual operating mechanism 260 can provide a mode in which the switching spool 220 is moved by the human operation on the operation shaft 265, in addition to the mode in which the switching spool 220 is moved by the action of the hydraulic pressure via the operating valve 250.

Accordingly, even if one of the control structure for electrically controlling the position of the operating valve 250 and the manual operating mechanism for manually controlling the position of the operating valve 250 should fail due to some trouble, the position of the operating piston 230 can be controlled by the other.

Next, the oil path in the above HST 100A will be described.

Figure 12:
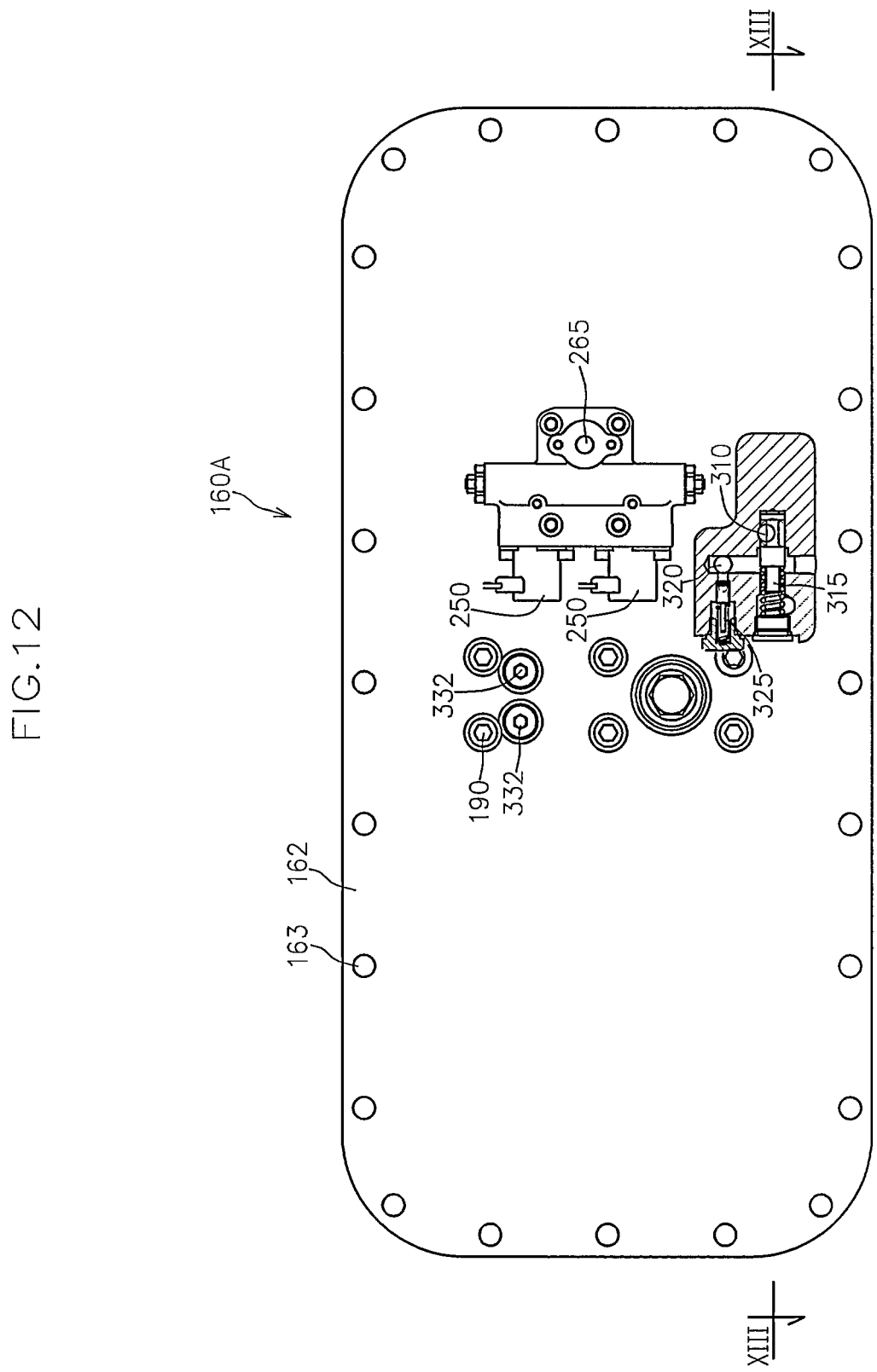
FIG. 12 is a front view of the HST in a state of being mounted on the transmission case, as viewed from the outside of the transmission case, and illustrates the part XII in FIG. 2 in cross section.

FIG. 12 is a front view of the HST 100A in a state of being mounted on the transmission case 20, as viewed from the outside of the transmission case 20. In FIG. 12, the part XII in FIG. 2 is illustrated in cross section.

Figure 13:
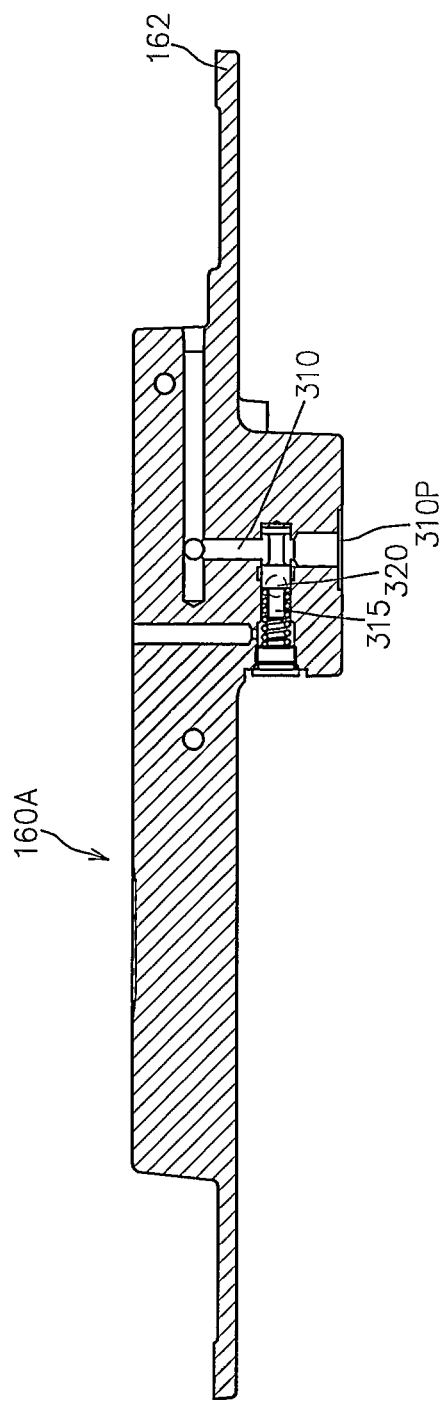
FIG. 13 is a cross-sectional view along the line XIII-XIII in FIG. 12.

FIG. 13 illustrates a cross-sectional view along the line XIII-XIII in FIG. 12.

Figure 14:
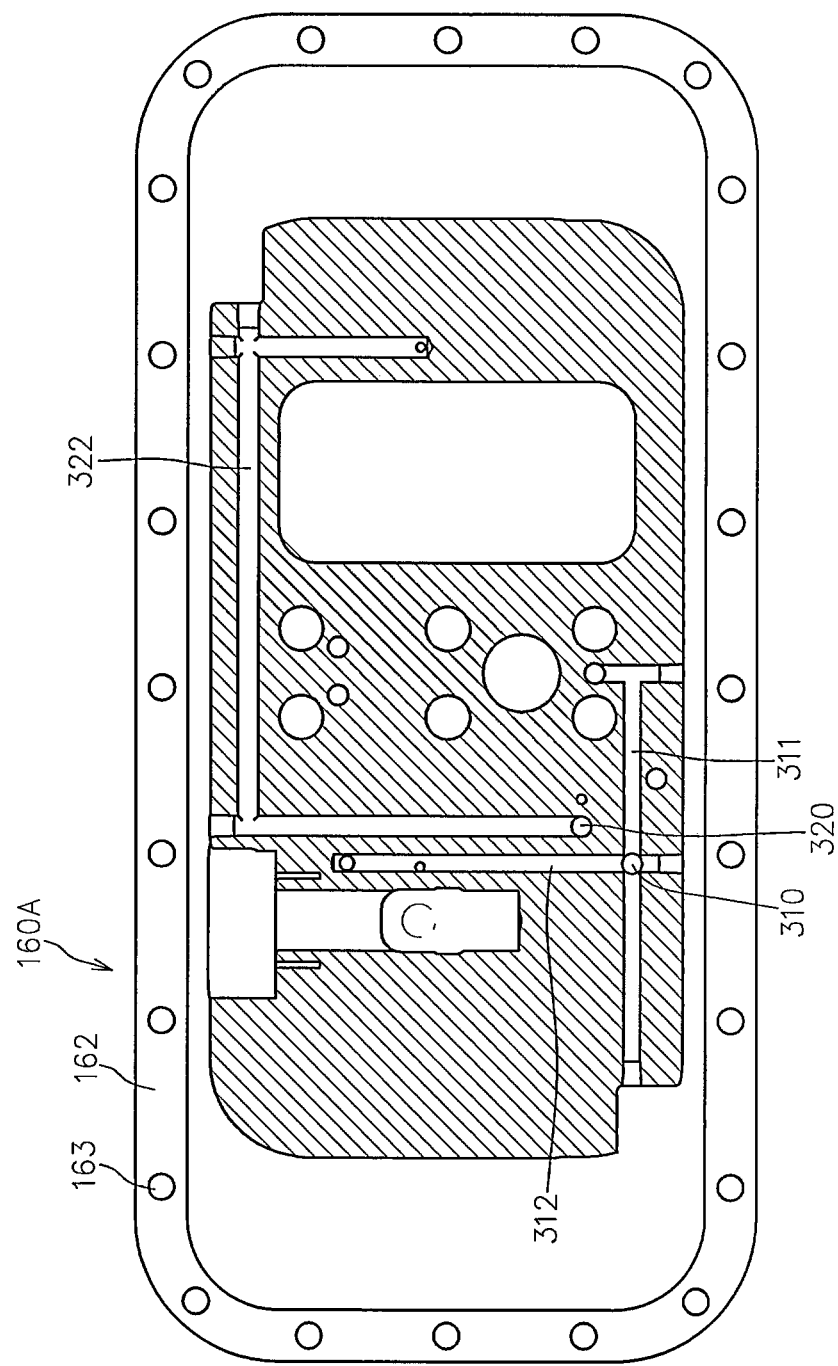
FIG. 14 is a cross-sectional view along the line XIV-XIV in FIG. 4.

Further, FIG. 14 illustrates a cross-sectional view along the line XIV-XIV in FIG. 4.

As illustrated in FIGS. 2, 5, and 13, the main plate 160A has a supply oil path 310 having one end portion opened to an outer surface to form an inlet port 310P, a charge relief valve 315 that sets the hydraulic pressure of the supply oil path 310, a lubrication oil path 320 that receives a relief oil of the charge relief valve 315, and a lubrication relief valve 325 that sets the oil pressure of the lubrication oil path 320.

As illustrated in FIG. 5, in the present embodiment, the pressure oil is supplied to the inlet port 310P via a piping 305 from an auxiliary pump 9 driven by the drive source of the work vehicle 1.

As illustrated in FIGS. 5 and 14, the supply oil path 310 has a downstream in the pressure oil flow direction that is branched into a charge supply oil path 311 and a servo supply oil path 312.

As illustrated in FIG. 7, the charge supply oil path 311 has a downstream side in the pressure oil flow direction opening on a contact surface with the center section 150A thereby to form a main plate side charge port 311P.

In the present embodiment, as described above, the center section-directed concave portion 165 is formed in the main plate 160A in which the center section 150A is engaged in a manner to be immovable in the thickness direction, and the main plate side charge port 311P is provided on the bottom surface of the center section-directed concave portion 165.

As illustrated in FIGS. 5 and 7, the center section 150A is formed with, in addition to the above pair of HST operation oil paths 151, a charge oil path 153 having one end portion opened to an outer surface to form a center section side charge port 153P.

The charge oil path 153 has a downstream side in the pressure oil flow direction branched into two directions that are respectively fluidly connected to the pair of HST operation oil paths 151 via check valves 154.

As illustrated in FIG. 5, in the present embodiment, the check valve 154 is provided with a high-pressure relief function, so that when one HST operation oil path 151 has an abnormally high pressure, the pressure oil in the one HST operation oil path 151 is relieved to the other HST operation oil path 151.

The servo supply oil path 312 is so configured as to supply the pressure oil to the operating valve 250 and the switching spool 220.

As illustrated in FIGS. 8 and 9, the transmission case 20 is capable of storing the oil in the first half portion, and an oil level OL of the transmission case 20 is set lower so as not to become a rotational resistance of the pump main body 115 and the motor main body 135 when the HST 100A is mounted on the transmission case 20. For this reason, as illustrated in FIG. 5 and the like, the lubrication oil path 320 has a pump-side lubrication oil path 321 and a motor-side lubrication oil path 322 so that forced lubrication is made for the HST 100A.

As illustrated in FIGS. 4, 5, and 8, etc., the pump-side lubrication oil path 321 is communicated to a predetermined lubrication site such as a bearing or a piston shoe via a lubrication oil path 126 formed in the pump-side swash plate holder 125A and an axial line hole 111 formed in the pump shaft 110.

As illustrated in FIGS. 4, 5, and 9, etc., the motor-side lubrication oil path 322 is communicated to a predetermined lubrication site such as a bearing or a piston shoe via a lubrication oil path 146 formed in the motor-side swash plate holder 145A and an axial line hole 131 formed in the motor shaft 130.

A reference numeral 330 in FIG. 7 is a pressure oil takeout oil path having one end portion connected to the HST operation oil path 151 and the other end portion opened on the outer surface of the main plate 160A thereby to form a takeout port for measuring the pressure in the HST operation oil path 151, and a reference numeral 332 in FIG. 12 is a plug which closes the takeout port.

Herein, the transmission 10A will be described.

As illustrated in FIG. 1, according to the present embodiment, the transmission 10A has a multi-step speed-change mechanism 40 that changes the rotational power of the output-side transmission shaft 35 in multiple steps, a differential mechanism 45 that differentially transmits the output of the multi-step speed-change mechanism 40 to a pair of left and right main drive axles 80, a traveling brake mechanism 50 for applying a braking force to the main drive axles 80, and a sub-drive wheel-directed power takeout mechanism 55 capable of outputting the output of the multi-step speed-change mechanism 40 to the sub-drive wheel.

The transmission 10A further has a PTO shaft 90 capable of outputting the rotational power toward external equipment such as work equipment, a PTO transmission shaft 92 operatively connected to the input-side transmission shaft 30, a PTO brake mechanism 94 and a PTO speed-change mechanism 96 interposed in the PTO transmission path from the input-side transmission shaft 30 to the PTO shaft 90.

Naturally, the HST 100A is applicable to another transmission 10B.

Figure 15:
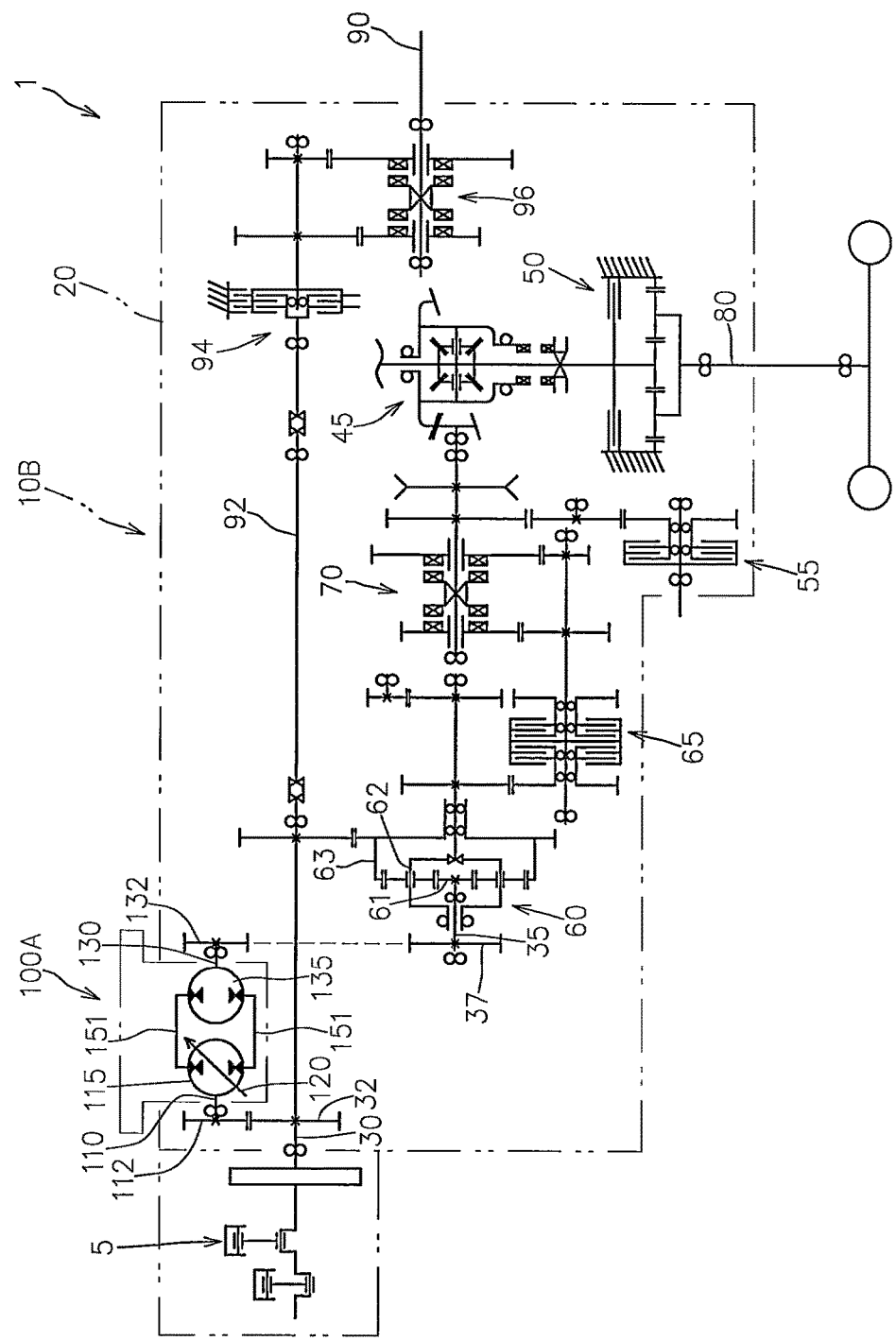
FIG. 15 is a schematic diagram of power transmission of a work vehicle to which another transmission including the HST is applied.

FIG. 15 illustrates a schematic diagram of power transmission of the work vehicle 1 to which the other transmission 10B provided with the above HST 100A is applied.

In the figure, the same reference numerals are attached to the same components as in the present embodiment.

The transmission 10B has a planetary gear mechanism 60, a front/rear switching mechanism 65, and a multi-step speed-change mechanism 70, in place of the multi-step speed-change mechanism 40.

The planetary gear mechanism 60 has three planetary elements including a sun gear 61, a planetary carrier 62 and an internal gear 63, and is so configured as to synthesize the rotational power of the HST 100A input via the output-side transmission shaft 35 and the rotational power of the drive source 5 input via the input-side transmission shaft 30, and to output the synthesized rotational power.

In the configuration illustrated in the figure, the rotational power of the HST 100A is input to the sun gear 61 via the output-side transmission shaft 35, the rotational power of the drive source 5 is input to the internal gear 63 via the input-side transmission shaft 30, and the synthesized rotational power is output from the planetary carrier 62.

Second Embodiment

Another embodiment of the HST according to the present invention will be described below with reference to the accompanying drawings.

Figure 16:
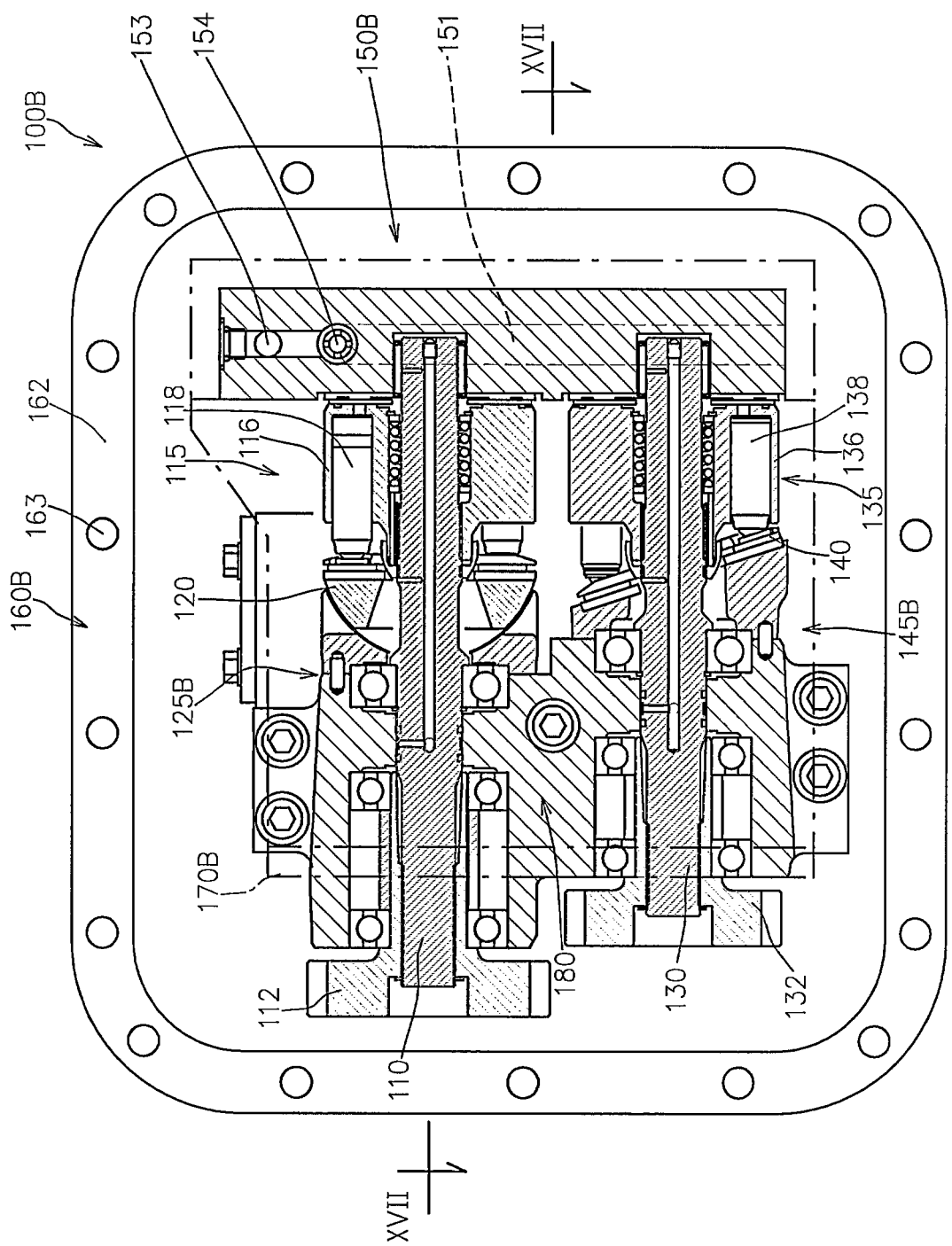
FIG. 16 is a vertical cross-sectional view of an HST according to a second embodiment of the present invention, and shows the vertical cross-sectional view corresponding to FIG. 6.

FIG. 16 illustrates a vertical cross-sectional view of an HST 100B according to the present embodiment in a state of being mounted on the transmission case 20, as viewed from the inside of the transmission case 20.

Figure 17:
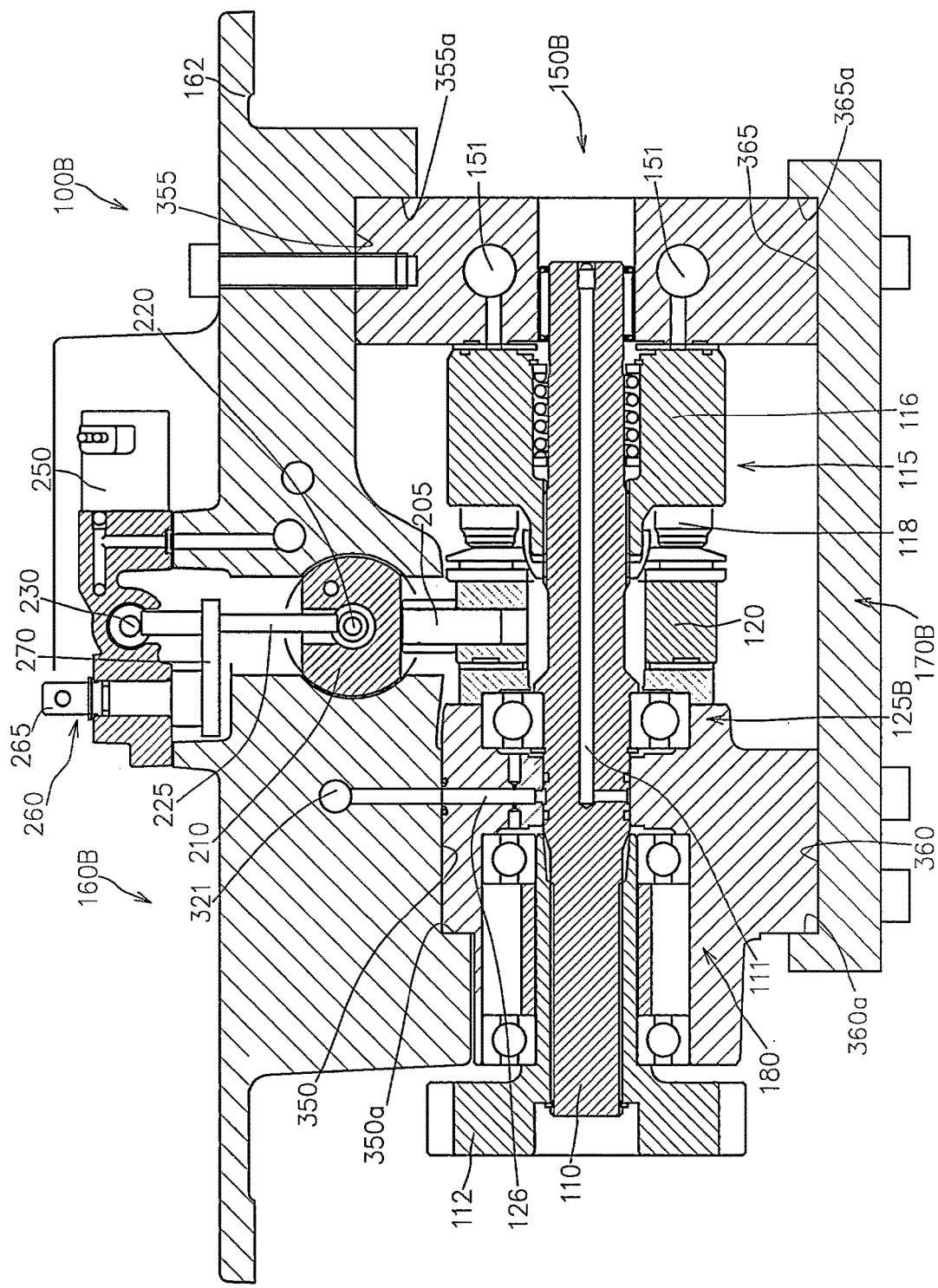
FIG. 17 is a cross-sectional view along the line XVII-XVII in FIG. 16.

FIG. 17 illustrates a cross-sectional view along the line XVII-XVII in FIG. 16.

In the figure, the same components as those in the first embodiment described above are designated by the same reference numerals and the description thereof will be omitted as appropriate.

The HST 100B according to the present embodiment differs from the HST 100A according to the first embodiment in that the HST 100B is of a parallel type in which the pump main body 115 and the motor main body 135 are arranged on one side in a thickness direction of the center section 150B in a state parallel to each other.

Specifically, the HST 100B includes: a center section 150B, a pump-side swash plate holder 125B, a motor-side swash plate holder 145B, a main plate 160B and a sub-plate 170B that hold or support the center section 150B, the pump-side swash plate holder 125B, and the motor-side swash plate holder 145B in a sandwiched manner in a state where both the pump-side swash plate holder 125B and the motor-side swash plate holder 145B are arranged on one side of the center section 150B in the thickness direction, the pump shaft 110 supported rotatably around an axial line by the center section 150B and the pump-side swash plate holder 125B, the pump main body 115 supported by the pump shaft 110 in a manner relatively non-rotatable with respect to the pump shaft 110, the pump-side swash plate 120 having the rear surface supported by the pump-side swash plate holder 125B, the motor shaft 130 that is, in a state of being parallel to the pump shaft 110, supported by the center section 150B and the motor-side swash plate holder 145B in a manner to be rotatable around the axial line, the motor main body 135 supported by the motor shaft 130 in a manner relatively non-rotatable with respect to the motor shaft 130, and the motor-side swash plate 140 having the rear surface supported by the motor-side swash plate holder 145B.

As illustrated in FIGS. 16 and 17, in the present embodiment, the pump-side swash plate holder 125B and the motor-side swash plate holder 145B are formed by a single common swash plate holder 180.

That is, the HST 100B is provided with the common swash plate holder 180 integrally having a portion acting as the pump-side swash plate holder 125B and a portion acting as the motor-side swash plate holder 145B, and the main plate and the sub-plate are so configured as to hold or support the center section and the common swash plate holder in a sandwiched manner.

Similar to the main plate 160A in the first embodiment, when viewed along the direction in which the main plate 160B and the sub-plate 170B face one another, the main plate 160B is provided with the extended region 162 that extends farther outward in the planar direction than the installation space of the center section 150B, the pump-side swash plate holder 125B, and the motor-side swash plate holder 145B (that is, the common swash plate holder 180), and than the sub-plate 170B.

The inner surfaces of the main plate 160B and the sub-plate 170B are provided with engagement concave portions into which the common swash plate holder 180 and the center section 150B are engaged in a manner to prevent the HST preassembly from moving in the axial line direction.

In the present embodiment, as illustrated in FIGS. 16 and 17, the inner surface of the main plate 160B is provided with a swash plate holder-directed concave portion 350 forming a step portion 350a that engages with an end surface of the common swash plate holder 180 that is on a far side from the center section 150B, and a center section-directed concave portion 355 forming a step 355a that engages with an end surface of the center section 150B that is on a far side from the common swash plate holder 180, as the engagement concave portions.

Also, the inner surface of the sub-plate 170B is provided with a swash plate holder-directed concave portion 360 forming a step portion 360a that engages with the end surface of the common swash plate holder 180 that is on the far side from the center section 150B, and a center section-directed concave portion 365 forming a step portion 365a that engages with the end surface of the center section 150B that is on the far side from the common swash plate holder 180, as the engagement concave portions.

Providing such a configuration allows the main plate 160B and the sub-plate 170B to stabilize the supporting state of the HST preassembly.

Third Embodiment

A still another embodiment of the HST according to the present invention will be described below with reference to the accompanying drawings.

Figure 18:
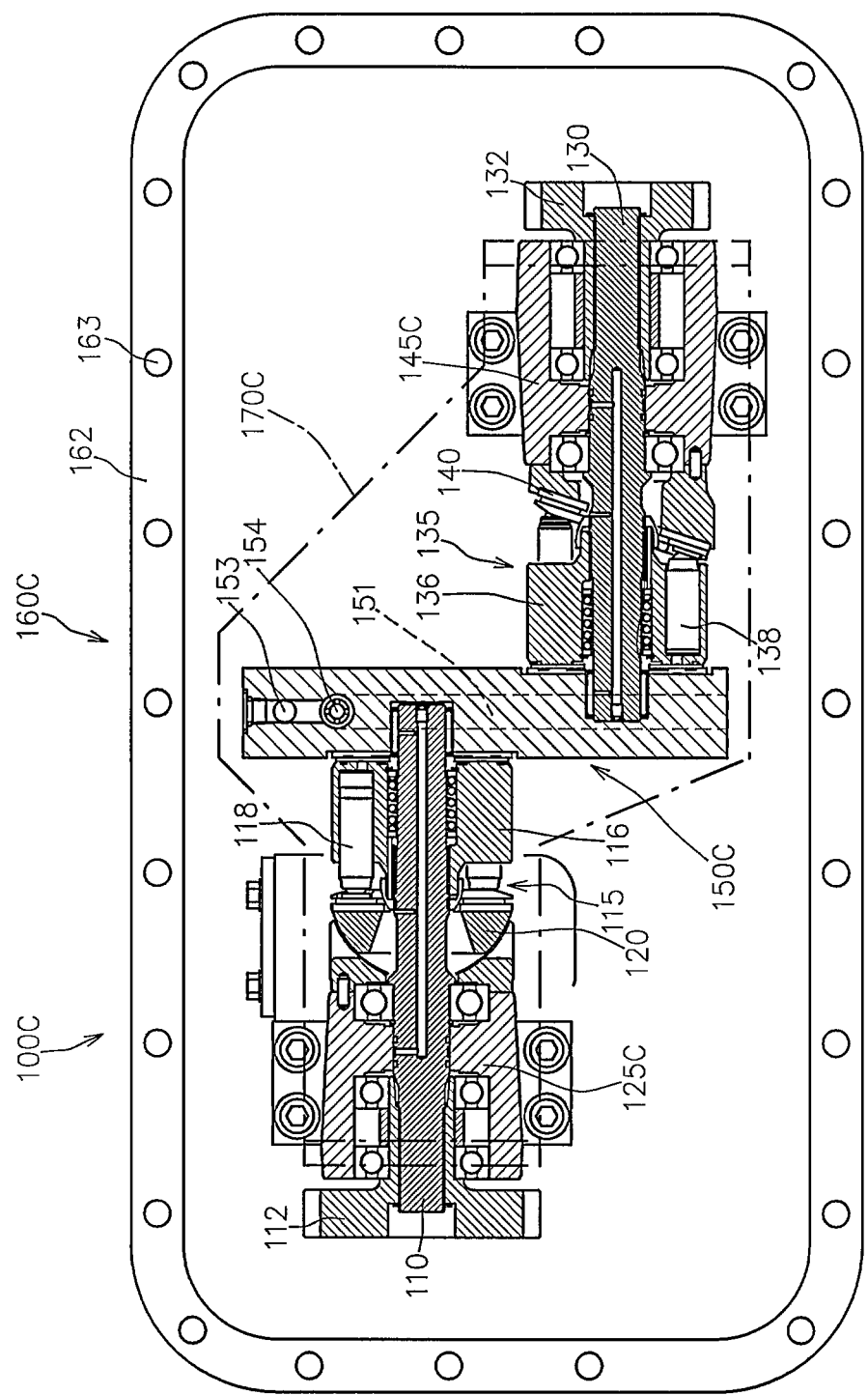
FIG. 18 is a vertical cross-sectional view of an HST according to a third embodiment of the present invention, and shows the vertical cross-sectional view corresponding to FIGS. 6 and 16.

FIG. 18 illustrates a vertical cross-sectional view of an HST 100C according to the present embodiment in a state of being mounted on the transmission case 20, as viewed from the inside of the transmission case 20.

In the figure, the same components as those in the first and second embodiment described above are designated by the same reference numerals and the description thereof will be omitted as appropriate The HST 100C according to the present embodiment is in common with the HST 100A according to the first embodiment in that the pump main body 115 and the motor main body 135 are respectively arranged on one side and the other side in the thickness direction of the center section 150C, but differs from the HST 100A in that the axial line positions of the pump main body 115 and the motor main body 135 are displaced from each other.

That is, in the HST 100C according to the present embodiment, the pump main body 115 is arranged on one side in the thickness direction of the center section 150C, while the motor main body 135 is arranged on the other side in the thickness direction of the center section 150C with the shaft line parallel to and at a different position from the shaft line of the pump main body 115.

Specifically, as illustrated in FIG. 18, the HST 100C includes: a center section 150C, a pump-side swash plate holder 125C, a motor-side swash plate holder 145C, a main plate 160C and a sub-plate 170C that hold or support the center section 150C, the pump-side swash plate holder 125C, and the motor-side swash plate holder 145C in a sandwiched manner in a state where the pump-side swash plate holder 125C and the motor-side swash plate holder 145C are respectively positioned on one side and the other side in the thickness direction of the center section 150B, the pump shaft 110 supported in a rotatable manner around the axial line by the center section 150C and the pump-side swash plate holder 125C, the pump main body 115 supported by the pump shaft 110 in a manner relatively non-rotatable around the axial line with respect to the pump shaft 110, the pump-side swash plate 120 having the rear surface supported by the pump-side swash plate holder 125C, the motor shaft 130 supported rotatably around the axial line by the center section 150C and the motor-side swash plate holder 145C in a manner to be parallel to the pump shaft 110 and to be different in the axial line position, the motor main body 135 supported by the motor shaft 130 in a manner relatively non-rotatable around the axial line with respect to the motor shaft 130, and the motor-side swash plate 140 having the rear surface supported by the motor-side swash plate holder 145B.

Similar to the main plate 160A in the first embodiment and the main plate 160B in the second embodiment, when viewed along the direction in which the main plate 160C and the sub-plate 170C face one another, the main plate 160C is provided with the extended region 162 extending farther outward in the planar direction than the installation space of the center section 150C, the pump-side swash plate holder 125C, and the motor-side swash plate holder 145C, and than the sub-plate 170C.

The inner surfaces of the main plate 160C and the sub-plate 170C are also provided with engagement concave portions into which the pump-side swash plate holder 125C, the center section 150C, and the motor-side swash plate holder 145C are engaged in a manner to prevent the HST preassembly from moving in the axial line direction.

The engagement concave portions for the center section 150C are so formed as to have step portions that engage with the end surfaces of the center section 150C on one side and the other side in the thickness direction.

The engagement concave portion for the pump-side swash plate holder 125C is so formed as to have a step portion that engages with an end surface of the pump-side swash plate holder 125C that is on a far side from the center section 150C.

The engagement concave portion for the motor-side swash plate holder 145C is so formed as to have a step portion that engages with an end surface of the motor-side swash plate holder 145C that is on a far side from the center section 150C.

Fourth Embodiment

A still another embodiment of the HST according to the present invention will be described below with reference to the accompanying drawings.

Figure 19:
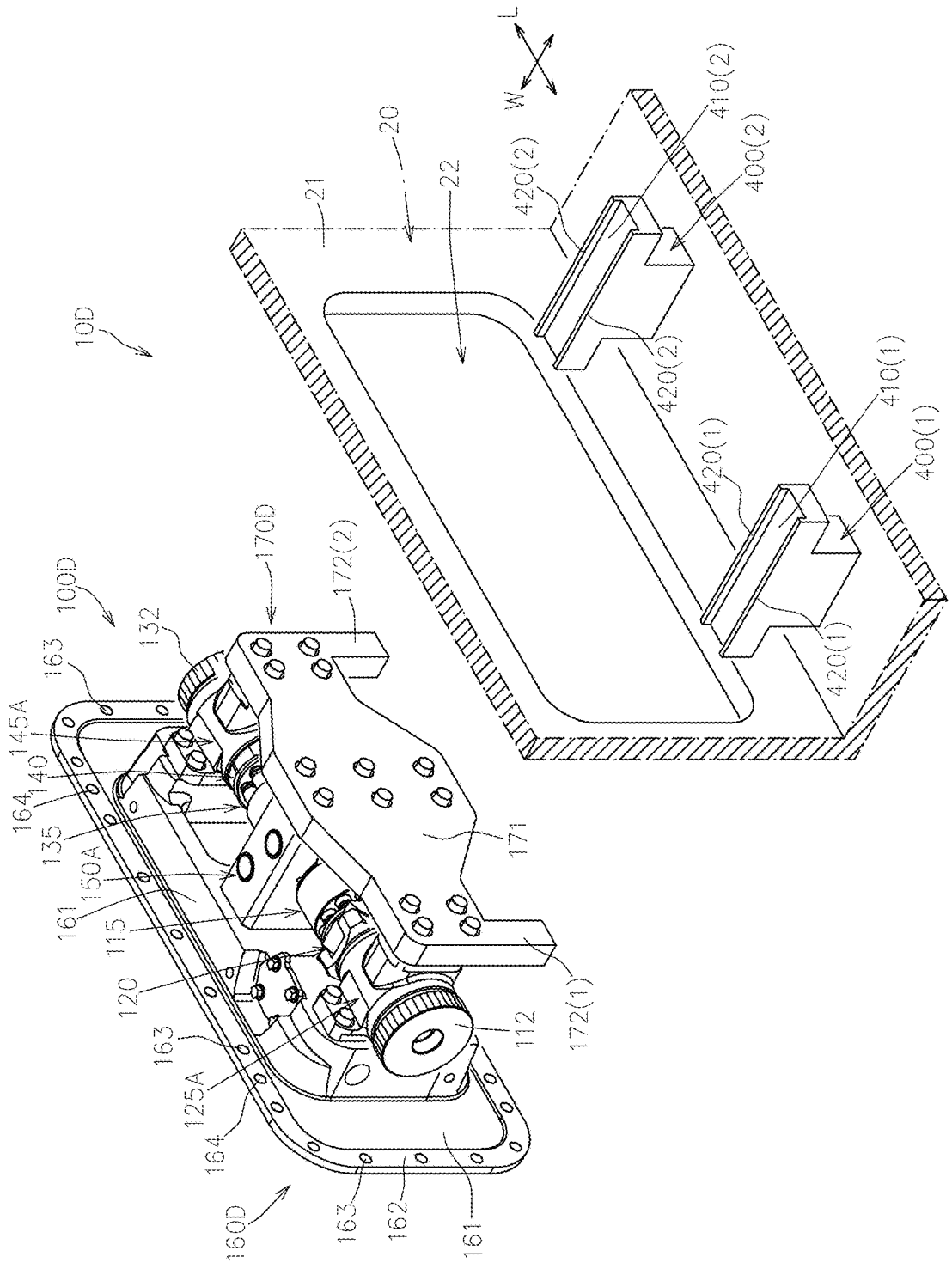
FIG. 19 is an exploded perspective view of a part of a transmission to which an HST according to a fourth embodiment of the present invention is applied.

FIG. 19 illustrates an exploded perspective view of a part of a transmission 10D to which an HST 100D according to the present embodiment is applied.

Figure 20:
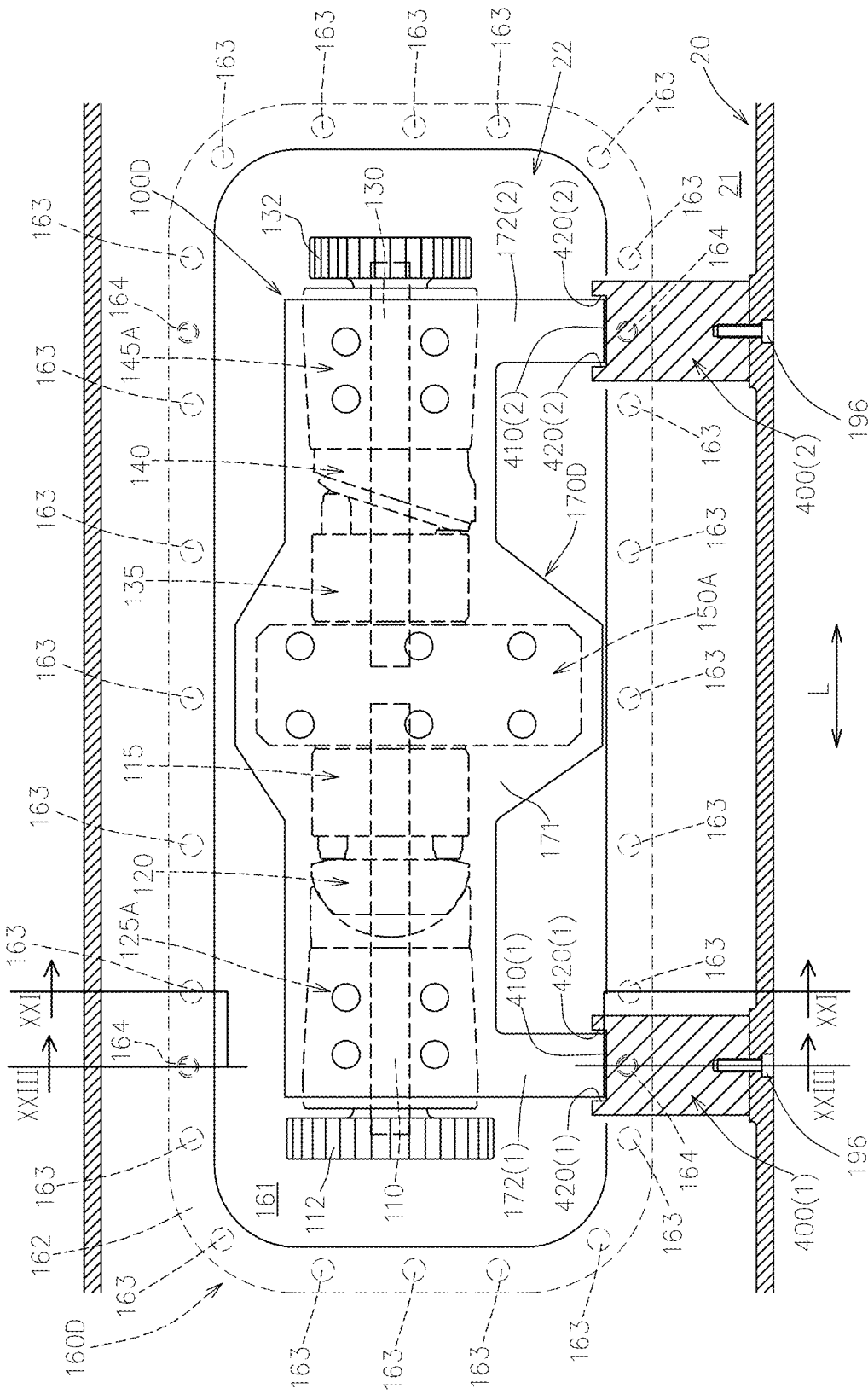
FIG. 20 is a vertical cross-sectional view of the HST according to the fourth embodiment in a state of being mounted on the transmission case, as viewed from the inside of the transmission case.

FIG. 20 illustrates a vertical cross-sectional view of the HST 100D in a state of being mounted on the transmission case 20, as viewed from the inside of the transmission case 20.

Figure 21:
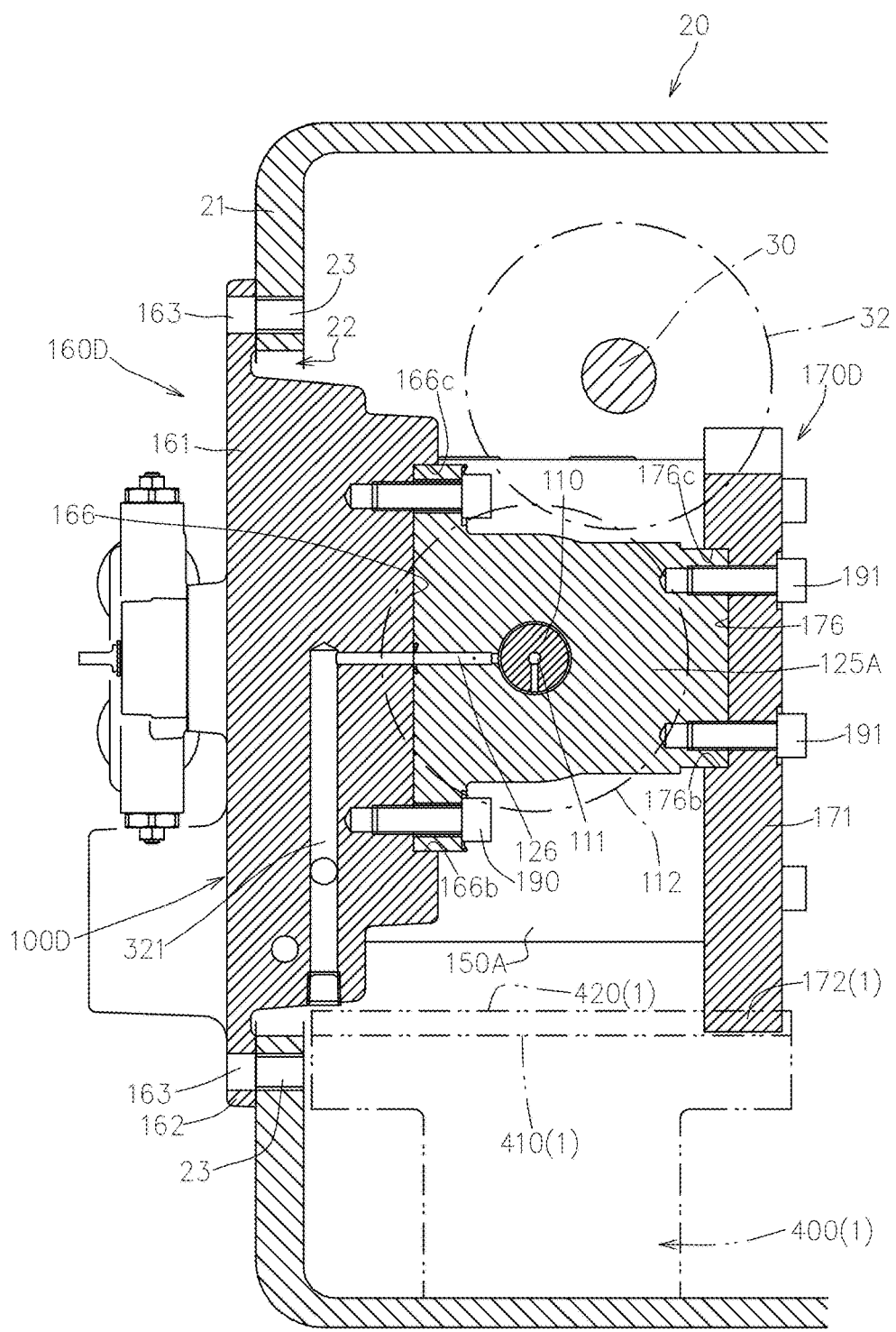
FIG. 21 is a cross-sectional view along the line XXI-XXI in FIG. 20.

FIG. 21 illustrates a cross-sectional view along the line XXI-XXI in FIG. 20.

In the figure, the same components as those in the embodiments described above are designated by the same reference numerals and the description thereof will be omitted as appropriate.

As illustrated in FIGS. 19 to 21 (see also FIGS. 1 and 2), the transmission 10D includes the transmission case 20, the input-side transmission shaft 30, the input-side transmission gear 32, the output-side transmission shaft 35, the output-side transmission gear 37 and the HST 100D according to the present embodiment.

The HST 100D includes the pump shaft 110, the pump main body 115, the pump-side holder 125A, the pump-side transmission gear 112, the motor shaft 130, the motor main body 135, the motor-side holder 145A, the motor-side transmission gear 132, the center section 150A, a main plate 160D and a sub-plate 170D.

As illustrated in FIGS. 19 and 20, the HST 100D according to the present embodiment is of an axial piston type in the similar manner as the above-explained embodiments.

Therefore, the HST 100D further includes the pump-side swash plate 120 that defines the capacity of the pump main body 115 and the motor-side swash plate 140 that defines the capacity of the motor main body 135.

The main plate 160D and the sub-plate 170D are configured to cooperate to each other so as to sandwich, in a direction orthogonal to the axial line of the pump shaft 110 and the motor shaft 130, members out of the center section 150A, the pump-side holder 125A and the motor-side holder 145A that face to each other in a state that the pump main body 115 and the motor main body 135 are arranged between the members in the axial line of the pump shaft 110 and the motor shaft 130.

As illustrated in FIGS. 19 and 20, in the HST 100D according to the present embodiment, the pump main body 115 and the motor main body 135 are arranged on one side and the other side of the center section 150A in the thickness direction, respectively, in the similar manner as the first embodiment. The pump-side swash plate holder 125A is arranged on a side of the pump main body 115 that is opposite from the center section 150A, and the motor-side swash plate holder 145A is arranged on a side of the motor main body 135 that is opposite from the center section 150A.

In this configuration, the pump-side swash plate holder 125A and the motor-side swash plate holder 145A are the members that face to each other with sandwiching the pump main body 115 and the motor main body 135 in the axial line of the pump shaft 110 and the motor shaft 130.

Therefore, the main plate 160D and the sub-plate 170D are configured to sandwich the pump-side swash plate holder 125A and the motor-side swash plate holder 145A in the direction orthogonal to the axial line of the pump shaft 110 and the motor shaft 130.

It is of course possible that the main plate 160D and the sub-plate 170D are configured to also sandwich the center section 150A as well as the pump-side swash plate holder 125A and the motor-side swash plate holder 145A.

In the HST of the parallel type in which the pump main body 115 and the motor main body 135 are arranged on one side in the thickness direction of the center section with their axial lines being parallel to each other as in the second embodiment, the center section and holders including the pump-side swash plate holder 125A and the motor-side swash plate holder 145A are the members that face to each other with sandwiching the pump main body 115 and the motor main body 135 in the axial line of the pump shaft 110 and the motor shaft 130.

Therefore, in the configuration, the main plate 160D and the sub-plate 170D are configured to sandwich center section and at least one of the pump-side swash plate holder and the motor-side swash plate holder in the direction orthogonal to the axial line of the pump shaft 110 and the motor shaft 130.

In the similar manner as the above-explained embodiments, the peripheral wall 21 of the transmission case 20 is provided with the opening 22.

The opening 22 is so sized as to allow, in the assembled state of the HST 100D, insertion of components other than the main plate 160D in the HST 100D.

Specifically, the main plate 160D includes a main-plate-side main body portion 161 facing an installation space of the center section 150A, the pump-side swash plate holder 125A and the motor-side swash plate holder 145A, and the extended region 162 extending outward in a planar direction from the main-plate-side main body portion 161.

The extended region 162 is configured to be brought into contact with the outer surface of the peripheral wall 21 when the HST 100D is placed at the installation position.

The extended region 162 is provided with the plurality of fastening holes 163.

The peripheral wall 21 is provided with a plurality of transmission-case-side threaded holes 23 at positions corresponding to the plurality of fastening holes 163.

The main plate 160D is detachably connected to transmission case 20 by fastening members such as a bolt that are inserted through the fastening holes 163 and threated into the transmission-case-side threaded holes 23 in a state that the HST 100D is arranged at the installation position.

The sub-plate 170D includes a sub-plate-side main body portion 171 cooperating with the main-plate-side main body portion 161 so as to sandwich the members (the pump-side holder 125A and the motor-side holder 145A in the present embodiment) out of the center section 150A, the pump-side holder 125A and the motor-side holder 145A that face to each other in a state that the pump main body 115 and the motor main body 135 are arranged between the members As illustrated in FIGS. 19 to 21, in the present embodiment, the sub-plate 170D is provided with an engaging portion 172 extending outward in a planar direction from the sub-plate-side main body portion 171.

In the present embodiment, the engaging portion 172 extends downward from the sub-plate-side main body portion 171 on the basis of the state where the HST 100D is installed.

The transmission case 20 is provided with a mounting seat 400 with which the engaging portion 170 is engaged in a slidable manner so that the HST 100D is guided until the installation position.

As illustrated in FIGS. 19 to 21, in the present embodiment, the mounting seat 400 is fixed to the bottom wall of the peripheral wall 21 of the transmission case 20 by fastening members such as a bolt so as to extend between the opening 22 and the installation position of the HST 100D, and is configured to receive at least a part of a weight of the HST 100D.

In the present embodiment, the mounting seat 400 is configured so that the engaging portion 172 is engaged therewith in such a manner as to prevent the HST 100D from moving a longitudinal direction L of the transmission case 20 while allowing the HST 100D to move in a width direction W of the transmission case 20 between the opening 22 and the installation position of the HST 100D.

Specifically, as illustrated in FIGS. 19 to 21, the mounting seat 400 includes a mounting surface 410 on which the engaging portion 172 is mounted in a movable manner in the width direction W of the transmission case 20, and a guide surface 420 that extends upward from the mounting surface 410 so as to prevent the engaging portion 172 from moving in the longitudinal direction L of the transmission case 20.

In the present embodiment, the engaging portion 172 includes a pair of first and second engaging portions 172(1), 172(2) that are apart from each other in the axial line direction on the pump shaft 110 and the motor shaft 130.

Accordingly, the mounting seat 400 includes first and second mounting seats 400(1), 400(2) that support the first and second engaging portions 172(1), 172(2) in a slidable manner, respectively.

The first mounting seat 400(1) includes a first mounting surface 410(1) on which the first engaging portion 172(1) is mounted in a movable manner in the width direction W of the transmission case 20, and a first guide surface 420(1) preventing the first engaging portion 172(1) from moving toward at least a first direction that is one side in the longitudinal direction L of the transmission case 20.

The second mounting seat 400(2) includes a second mounting surface 410(2) on which the second engaging portion 172(2) is mounted in a movable manner in the width direction W of the transmission case 20, and a second guide surface 420(2) preventing the second engaging portion 172 (2) from moving toward at least a second direction that is the other side in the longitudinal direction L of the transmission case 20.

In the present embodiment, the first guide surface 420(1) is provided on each of both edges of the first mounting surface 410(1) in the longitudinal direction L of the transmission case 20, and the second guide surface 420(2) is provided on each of both edges of the second mounting surface 410(2) in the longitudinal direction L of the transmission case 20.

Alternatively, as illustrated in FIG. 22A, it is possible that the first guide surface 420(1) is provided only on the edge of the first mounting surface 410(1) that is on a side of the first direction in the longitudinal direction L of the transmission case 20, and the second guide surface 420(2) is provided only on the edge of the second mounting surface 410(2) that is on a side of the second direction in the longitudinal direction L of the transmission case 20.

As illustrated in FIG. 22B, it is also possible that the first guide surface 420(1) is provided only on the edge of the first mounting surface 410(1) that is on a side of the second direction in the longitudinal direction L of the transmission case 20, and the second guide surface 420(2) is provided only on the edge of the second mounting surface 410(2) that is on a side of the first direction in the longitudinal direction L of the transmission case 20.

Figure 23:
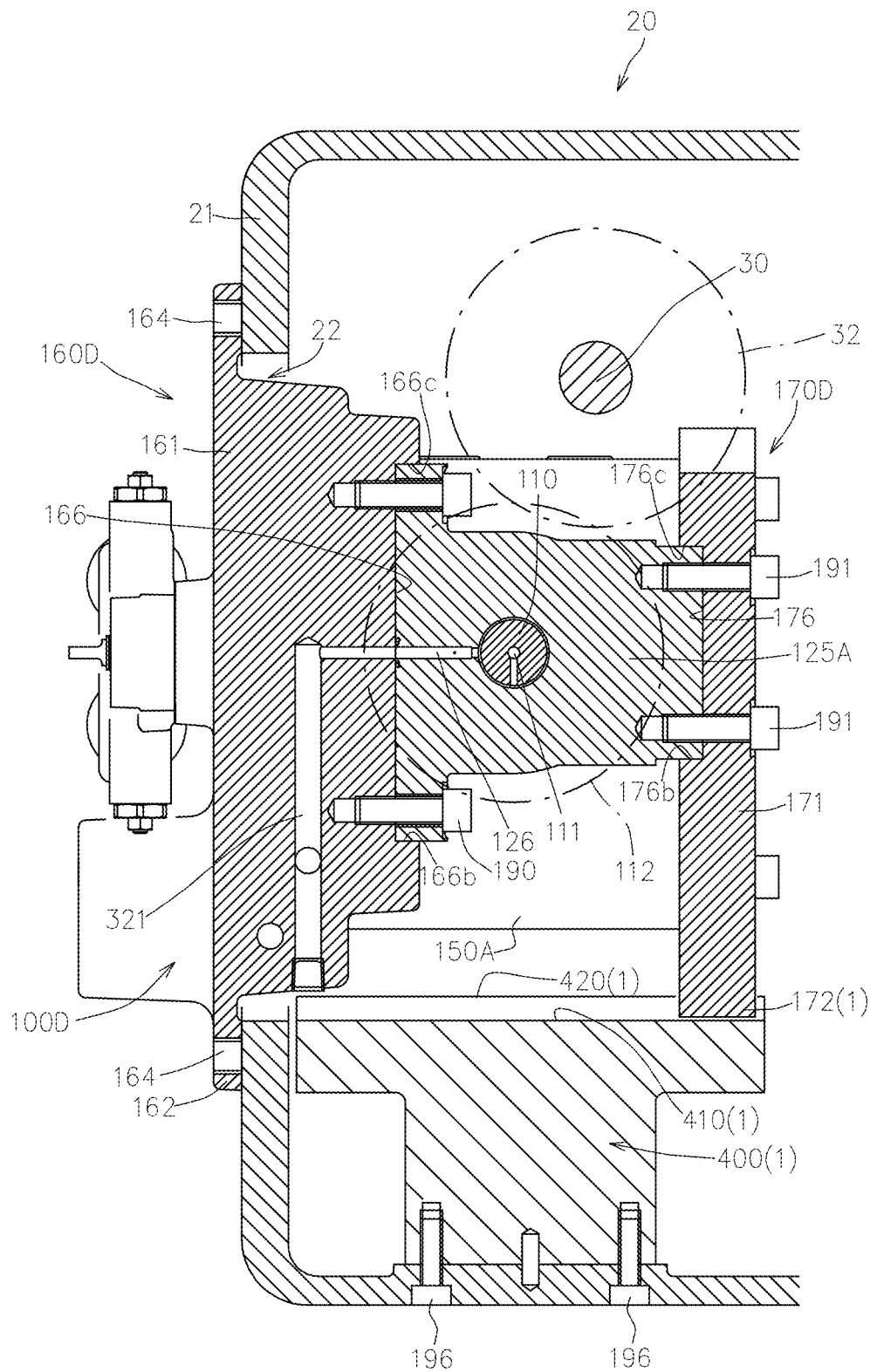
FIG. 23 is a cross-sectional view along the line XXIII-XXIII in FIG. 20.

FIG. 23 illustrates a cross-sectional view along the line XXIII-XXIII in FIG. 20.

As illustrated in FIGS. 20 and 23, in the present embodiment, the extended region 162 of the main plate 160D is formed with a plurality of main-plate-side threaded holes 164 in addition to the plurality of fastening holes 163.

The plurality of main-plate-side threaded holes 164 are provided at positions facing the outer surface of the peripheral wall 21 when the HST 100D is placed at the installation position.

The provision of the main-plate-side threaded hole 164 makes it possible to improve efficiency in work of taking out the HDT 100D that is arranged at the installation position.

Figure 24:
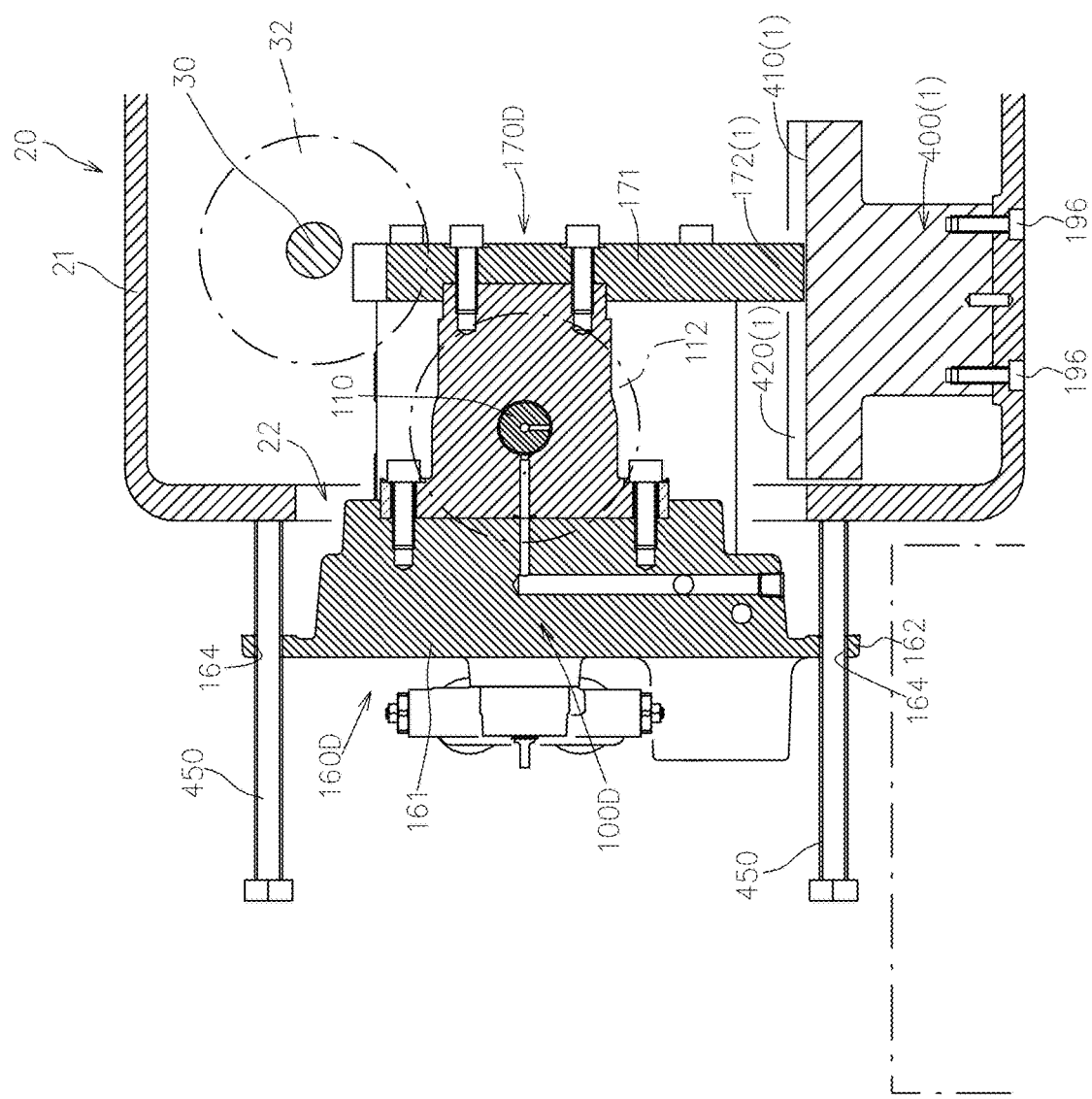
FIG. 24 is a cross-sectional view of a halfway state in which the HST according to the fourth embodiment is taken out from the transmission case.

FIG. 24 illustrates a cross-sectional view of a halfway state in which the HST 100 is taken out from the transmission case 20.

When a removal bolt 450 is threaded into the main-plate-side threaded hole 164 in a state that the fastening members inserted into the fastening holes 163 and threated into the transmission-case-side threaded holes 23 are detached, the removal bolt 450 is rotated around an axial line with its distal end being come into contact with the peripheral wall 21.

Since the removal bolt 450 is threadedly engaged with the main-plate-side threaded hole 164, the rotation of the removal bolt 450 around an axial line with its distal end being come into contact with the peripheral wall 21 causes the main plate 160D to move away from the peripheral wall 21 in a state that the main plate 160D is guided by the removal bolt 450, whereby the HST 100D moves in a removal direction from the transmission case 20 in a state of being supported by the mounting seat 400.

Although, in the present embodiment, the engaging portion 172 has a convex shape projecting outward from the sub-plate-side main body portion 171 and he mounting seat 400 has a concave shape capable of receiving the engaging portion 172 having the convex shape, it is of course possible that the engaging portion 172 has a concave shape and the mounting seat 400 has a corresponding convex shape.

DESCRIPTION OF THE REFERENCE NUMERALS 10A-10D transmission
20 transmission case
21 peripheral wall
22 opening
23 transmission-case-side threaded hole 30 input-side transmission shaft
32 input-side transmission gear
35 output-side transmission shaft
37 output-side transmission gear
100A-100D HST
110 pump shaft
112 pump-side transmission gear
115 pump main body
120 pump-side swash plate
125A-125C pump-side swash plate holder
130 motor shaft
132 motor-side transmission gear
135 motor main body
140 motor-side swash plate
145A-145C motor-side swash plate holder
150A-150C center section
160A-160D main plate
161 main-plate-side main body portion
162 extended region
164 main-plate-side threaded hole
170A-170D sub-plate
171 sub-plate-side main body portion
172(1),172(2) first and second engaging portions
400(1), 400(2) first and second mounting seats
410(1), 410(2) first and second mounting surfaces
420(1), 420(2) first and second guide surfaces

What is claimed is:

1. A transmission that speed-changes rotational power operatively input from a drive source, the transmission comprising:
 a transmission case; and
 an HST arranged at a predetermined installation position within the transmission case,
 wherein the HST includes a pump shaft, a pump main body supported by the pump shaft in a relatively non-rotatable manner around an axial line with respect to the pump shaft, a pump-side holder supporting the pump shaft in a rotatable manner around the axial line, a motor shaft, a motor main body supported by the motor shaft in a relatively non-rotatable manner around an axial line with respect to the motor shaft, a motor-side holder that supporting the motor shaft in a rotatable manner around the axial line, a center section that is formed with oil paths fluidly connecting the pump main body and the motor main body, and a main plate and a sub-plate sandwiching members out of the center section, the pump-side holder and the motor-side holder that face to each other in a state that the pump main body and the motor main body are arranged between the members,
 wherein the transmission case has a peripheral wall and an opening formed in the peripheral wall,
 wherein the opening is so sized as to allow, in an assembled state of the HST, insertion of components other than the main plate of the HST,
 wherein the HST is configured so that the main plate is detachably connected to an outer surface of the peripheral wall of the transmission case in a state where the HST is arranged at the installation position,
 wherein the sub-plate is provided with an engaging portion, and
 wherein the transmission case is provided with a mounting seat with which the engaging portion is engaged in a slidable manner so that the HST is guided until the installation position.

2. The transmission according to claim 1 further comprising,
 an input-side transmission shaft that is operatively connected to the drive source and is supported by the transmission case in a rotatable manner around an axial line;
 an input-side transmission gear supported by the input-side transmission shaft in a relatively non-rotatable manner around the axial line with respect to the input-side transmission shaft within the transmission case;
 an output-side transmission shaft supported by the transmission case in a rotatable manner around an axial line; and
 an output-side transmission gear supported by the output-side transmission shaft in a relatively non-rotatable manner around the axial line with respect to the output-side transmission shaft within the transmission case,
 wherein the HST further includes a pump-side transmission gear supported, in a relatively non-rotatable manner around the axial line with respect to the pump shaft, by a portion of the pump shaft that extends from the pump-side holder in a direction away from the pump main body, and a motor-side transmission gear supported, in a relatively non-rotatable manner around the axial line with respect to the motor shaft, by a portion of the motor shaft that extends from the motor-side holder in a direction away from the motor main body, and
 wherein the pump-side transmission gear and the motor-side transmission gear mesh with the input-side transmission gear and the output-side transmission gear, respectively, in accordance with arrangement of the HST at the installation position.

3. The transmission according to claim 1,
 wherein the pump main body and the motor main body are of an axial piston type,
 wherein the pump-side holder is configured to support a pump-side swash plate defining a capacity of the pump main body and have a through hole through which the pump shaft is passed, and
 wherein the motor-side holder is configured to support a motor-side swash plate defining a capacity of the motor main body and have a through hole through which the motor shaft is passed.

4. The transmission according to claim 1,
 wherein the sub-plate includes a sub-plate-side main body portion cooperating with the main plate so as to sandwich the members out of the center section, the pump-side holder and the motor-side holder that face to each other in a state that the pump main body and the motor main body are arranged between the members, and the engaging portion extending downward from the sub-plate-side main body portion, and
 wherein the mounting seat is provided on a bottom wall of the peripheral wall of the transmission case so as to extend between the opening and the installation position of the HST.

5. The transmission according to claim 4,
 wherein the mounting seat is configured so that the engaging portion is engaged therewith in such a manner as to prevent the HST from moving a longitudinal direction of the transmission case while allowing the HST to move in a width direction of the transmission case between the opening and the installation position of the HST.

6. The transmission according to claim 5,
 wherein the mounting seat includes a mounting surface on which the engaging portion is mounted in a movable manner in the width direction of the transmission case, and a guide surface that extends upward from the mounting surface so as to prevent the engaging portion from moving in the longitudinal direction of the transmission case.

7. The transmission according to claim 6,
wherein the mounting seat has first and second mounting seats arranged apart from each other in the longitudinal direction of the transmission case,
wherein the engaging portion has first and second engaging portions that engage with the first and second mounting seats, respectively,
wherein the first mounting seat includes a first mounting surface on which the first engaging portion is mounted in a movable manner in the width direction of the transmission case, and a first guide surface preventing the first engaging portion from moving toward at least one side in the longitudinal direction of the transmission case, and
wherein the second mounting seat includes a second mounting surface on which the second engaging portion is mounted in a movable manner in the width direction of the transmission case, and a second guide surface preventing the second engaging portion from moving toward at least the other side in the longitudinal direction of the transmission case.

8. The transmission according to claim 1,
wherein the main plate includes a main-plate-side main body portion cooperating with the sub-plate so as to sandwich the members out of the center section, the pump-side holder and the motor-side holder that face to each other in a state that the pump main body and the motor main body are arranged between the members, and an extended region extending outward in a planar direction from the main-plate-side main body portion and brought into contact with an outer surface of the peripheral wall of the transmission case in a state that the HST is arranged at the installation position, and
wherein the extended region is provided with a plurality of fastening holes and a plurality of main-plate-side threaded holes,
wherein the peripheral wall of the transmission case is provided with a plurality of transmission-case-side threaded holes, and
wherein the plurality of fastening holes are provided at positions corresponding to the plurality of transmission-case-side threaded holes, respectively, and the plurality of main-plate-side threaded holes are provided at positions facing the outer surface of the peripheral wall.

9. An HST comprising:
a pump shaft;
a pump main body supported by the pump shaft in a relatively non-rotatable manner around an axial line with respect to the pump shaft;
a pump-side swash plate defining a capacity of the pump main body;
a pump-side holder supporting the pump-side swash plate and also supporting the pump shaft in a rotatable manner around the axial line;
a motor shaft;
a motor main body supported by the motor shaft in a relatively non-rotatable manner around an axial line with respect to the motor shaft;
a motor-side swash plate defining a capacity of the motor main body;
a motor-side swash plate holder supporting the motor-side swash plate and also supporting the motor shaft in a rotatable manner around the axial line;
a center section formed with oil paths fluidly connecting the pump main body and the motor main body; and
a main plate and a sub-plate sandwiching members out of the center section, the pump-side holder and the motor-side holder that face to each other in a state that the pump main body and the motor main body are arranged between the members,
wherein the main plate includes a main-plate-side main body portion facing an installation space of the center section, the pump-side swash plate holder and the motor-side swash plate holder, and an extended region extending outward in a planar direction from the main-plate-side main body portion, and
wherein the sub-plate includes a sub-plate-side main body portion cooperating with the main-plate-side main body portion so as to sandwich the members out of the center section, the pump-side holder and the motor-side holder that face to each other in a state that the pump main body and the motor main body are arranged between the members, and an engaging portion extending outward in a planar direction from the sub-plate-side main body portion.

\* \* \* \* \*